(12) United States Patent
Adedeji et al.

(10) Patent No.: US 6,810,333 B2
(45) Date of Patent: Oct. 26, 2004

(54) METHOD, SYSTEM, STORAGE MEDIUM, AND DATA SIGNAL FOR SUPPLYING A MULTI-COMPONENT COMPOSITION

(75) Inventors: Adeyinka Adedeji, Albany, NY (US); Keith Andrew DuPont, Glenmont, NY (US); John C. Haylock, Schenectady, NY (US)

(73) Assignee: General Electric Company, Pittsfield, MA (US)

( * ) Notice: Subject to any disclaimer, the term of this patent is extended or adjusted under 35 U.S.C. 154(b) by 110 days.

(21) Appl. No.: 09/683,766

(22) Filed: Feb. 12, 2002

(65) Prior Publication Data

US 2003/0171877 A1 Sep. 11, 2003

(51) Int. Cl.[7] .............................................. G06F 13/14
(52) U.S. Cl. ........................ 702/27; 702/19; 702/22; 702/23; 702/30; 702/31
(58) Field of Search ........................... 702/19, 22, 23, 702/27, 30–32, 123, 180, 183, 189; 435/325; 530/351; 422/158; 600/300; 706/13

(56) References Cited

U.S. PATENT DOCUMENTS

| | | | |
|---|---|---|---|
| 4,239,673 A | 12/1980 | Lee, Jr. | |
| 4,242,263 A | 12/1980 | Lee, Jr. | |
| 4,299,757 A | 11/1981 | Kuribayashi et al. | |
| 4,383,082 A | 5/1983 | Lee, Jr. | |
| 4,460,743 A | 7/1984 | Abe et al. | |
| 4,480,057 A | 10/1984 | Sano | 523/206 |
| 4,565,684 A | 1/1986 | Tibbetts et al. | 423/447.3 |
| 4,572,813 A | 2/1986 | Arakawa | 264/29.2 |
| 4,663,230 A | 5/1987 | Tennent | 428/367 |
| 4,713,416 A | 12/1987 | Del Giudice et al. | |
| 4,764,559 A | 8/1988 | Yamauchi et al. | |
| 4,772,657 A | 9/1988 | Akiyama et al. | |
| 4,816,289 A | 3/1989 | Komatsu et al. | 423/447.3 |
| 4,863,997 A | 9/1989 | Shibuya et al. | |
| 4,876,078 A | 10/1989 | Arakawa et al. | 423/447.3 |
| 4,892,904 A | 1/1990 | Ting | |
| 4,962,148 A | 10/1990 | Orikasa et al. | |
| 4,985,495 A | 1/1991 | Nishio et al. | |
| 4,990,558 A | 2/1991 | DeNicola, Jr. et al. | 524/504 |

(List continued on next page.)

FOREIGN PATENT DOCUMENTS

| | | |
|---|---|---|
| EP | 0 326 895 A2 | 1/1989 |
| EP | 0 412 787 A3 | 8/1990 |
| EP | 0 765 914 A1 | 5/1995 |
| EP | 0 865 890 A1 | 9/1998 |
| EP | 1 029 876 | 9/1999 |
| GB | 1 559 262 | 12/1977 |
| WO | WO 90/05759 | 5/1990 |
| WO | WO 91/05016 | 4/1991 |
| WO | WO 01/61574 | 8/2001 |

OTHER PUBLICATIONS

TUFTEC® H1043 Technical Bulletin, Dec. 16, 1999, Asahi Chemical Industry Co., Ltd., pp. 1–5.

(List continued on next page.)

*Primary Examiner*—Marc S. Hoff
*Assistant Examiner*—Felix Suarez

(57) ABSTRACT

A method for specifying a multi-component composition without human intervention includes customer specification of at least two physical property limitations, and determination of a recommended composition meeting those limitations using a continuous model relating the physical properties to the compositional variables. The method may extend to supplying a multi-component composition by further including one or more of calculating the cost of the recommended composition, calculating the price of the recommended composition, formulating a contracted amount of the recommended composition, and billing for a contracted amount of the recommended composition.

37 Claims, 12 Drawing Sheets

U.S. PATENT DOCUMENTS

| | | | |
|---|---|---|---|
| 4,994,508 A | 2/1991 | Shiraki et al. | |
| 5,024,818 A | 6/1991 | Tibbetts et al. | 422/158 |
| 5,056,029 A | 10/1991 | Cannon | 364/468 |
| 5,061,753 A | 10/1991 | Maruyama et al. | |
| 5,071,911 A | 12/1991 | Furuta et al. | |
| 5,071,912 A | 12/1991 | Furuta et al. | |
| 5,075,376 A | 12/1991 | Furuta et al. | |
| 5,079,295 A | 1/1992 | Furuta et al. | |
| 5,081,187 A | 1/1992 | Maruyama et al. | |
| 5,086,112 A | 2/1992 | Togo et al. | |
| 5,106,696 A | 4/1992 | Chundury et al. | |
| 5,124,410 A | 6/1992 | Campbell | |
| 5,132,363 A | 7/1992 | Furuta et al. | |
| 5,149,740 A | 9/1992 | Maruyama et al. | |
| 5,159,004 A | 10/1992 | Furuta et al. | |
| 5,162,433 A | 11/1992 | Nishio et al. | |
| 5,162,435 A | 11/1992 | Shibuya et al. | |
| 5,162,440 A | 11/1992 | Akkapeddi et al. | |
| 5,165,909 A | 11/1992 | Tennent et al. | 423/447.3 |
| 5,166,264 A | 11/1992 | Lee, Jr. et al. | |
| 5,182,151 A | 1/1993 | Furuta et al. | |
| 5,191,024 A | 3/1993 | Shibata et al. | |
| 5,206,281 A | 4/1993 | Furuta | |
| 5,262,477 A | 11/1993 | Kasai et al. | |
| 5,268,425 A | 12/1993 | Furuta et al. | |
| 5,272,208 A | 12/1993 | Shiraki et al. | |
| 5,272,209 A | 12/1993 | Shiraki et al. | |
| 5,278,220 A | 1/1994 | Vermeire et al. | |
| 5,286,791 A | 2/1994 | DeNicola, Jr. et al. | |
| 5,290,856 A | 3/1994 | Okamoto et al. | |
| 5,296,540 A | 3/1994 | Akiyama et al. | |
| 5,304,593 A | 4/1994 | Nishio et al. | |
| 5,321,081 A | 6/1994 | Chundury et al. | |
| 5,367,260 A * | 11/1994 | Dechene et al. | 324/307 |
| 5,369,173 A | 11/1994 | Furuta | |
| 5,370,813 A | 12/1994 | DeNicola, Jr. et al. | |
| 5,397,822 A | 3/1995 | Lee, Jr. et al. | 524/127 |
| 5,402,333 A | 3/1995 | Cardner | 364/151 |
| 5,405,902 A | 4/1995 | Nishio et al. | |
| 5,418,287 A | 5/1995 | Tanaka et al. | |
| 5,424,360 A | 6/1995 | Nagaoka et al. | |
| 5,428,091 A | 6/1995 | Abe et al. | |
| 5,461,111 A | 10/1995 | Modic et al. | |
| 5,473,015 A | 12/1995 | DeNicola, Jr. et al. | |
| 5,494,962 A | 2/1996 | Gauthy et al. | |
| 5,546,564 A | 8/1996 | Horie | 395/500 |
| 5,550,746 A | 8/1996 | Jacobs | 364/479.01 |
| 5,570,292 A | 10/1996 | Abraham et al. | 364/473.01 |
| 5,589,152 A | 12/1996 | Tennent et al. | 423/447.3 |
| 5,591,382 A | 1/1997 | Nahass et al. | 252/511 |
| 5,648,424 A | 7/1997 | Miwa et al. | |
| 5,705,556 A | 1/1998 | Djiauw et al. | |
| 5,777,028 A | 7/1998 | Okada et al. | |
| 5,902,850 A | 5/1999 | Chino et al. | |
| 5,998,029 A | 12/1999 | Adzima et al. | 428/392 |
| 6,005,050 A | 12/1999 | Okada et al. | |
| 6,013,726 A | 1/2000 | Nakano et al. | |
| 6,045,883 A | 4/2000 | Akiyama et al. | |
| 6,057,401 A | 5/2000 | Modic | 525/92 |
| 6,110,213 A | 8/2000 | Vinciarelli et al. | 364/468.03 |
| 6,258,881 B1 | 7/2001 | Moritomi | 524/267 |
| 6,300,417 B1 | 10/2001 | Sue et al. | 525/191 |
| 6,308,142 B1 | 10/2001 | Choate et al. | 702/179 |
| 6,493,637 B1 * | 12/2002 | Steeg | 702/19 |
| 6,509,412 B1 | 1/2003 | Hall | 525/92 |
| 6,547,994 B1 * | 4/2003 | Monkhouse et al. | 264/40.1 |
| 2002/0023845 A1 | 2/2002 | Ding et al. | |
| 2003/0078738 A1 * | 4/2003 | Wouters et al. | 702/22 |
| 2003/0149504 A1 | 8/2003 | Iwaki et al. | 700/117 |

OTHER PUBLICATIONS

TUFTEC® P–Series High Performance Thermoplastic Elastomer, pp. 1–2. <http: www.asahi–kasei.co.jp/plastic/e/technical/br/p–series.htm>.

G.-X. Wei, H.-J. Sue, J. Chu, C. Huang, K. Gong, "Morphology and Mechanical Property of Poly(phenylene oxide) Modified Polypropylene Blends", ANTEC '99, vol. III, New York City, 2nd–6th May 1999, pp. 3443–3447.

M. K. Akkapeddi and B. VanBuskirk, Adv. Polym. Technol. (1992), vol. 11, No. 4, pp. 263–275.

Derwent Abstract for JP 63–113047.
Derwent Abstract for JP 63–113049.
Derwent Abstract for JP 63–113050.
Derwent Abstract for JP 01–098647.
Derwent Abstract for JP 03–259941.
Chemical Abstracts Record for JP 03181555.
Chemical Abstracts Record for JP 03185058.
Chemical Abstracts Record for JP 03231962.
Derwent Abstract for JP 04–007357.
Derwent Abstract for JP 04–028739.
Derwent Abstract for JP 04–028740.
Chemical Abstracts Record for JP 04183748.
Derwent Abstract for JP 04–279697.
Derwent Abstract for JP 04–293942.
Derwent Abstract for JP 05–070679.
Derwent Abstract for JP 05–295184.
Derwent Abstract for JP 06–009828.
Derwent Abstract for JP 06–016924.
Derwent Abstract for JP 06–057130.
Derwent Abstract for JP 06–136202.
Derwent Abstract for JP 07–003083.
Chemical Abstracts Record for JP 07165998.
Chemical Abstracts Record for JP 07166026.
Derwent Abstract for JP 07–304908.
Derwent Abstract for JP 09–316322.
Derwent Abstract for JP 11–060836.
Derwent Abstract for JP 2000–143891.

G. E. P. Box, W. G. Hunter, and J. S. Hunter, "Statistics for Experiments; An Introduction to Design, Data Analysis, and Model Building", New York: Wiley–Interscience (1978), pp. 306–344.

C. L. Agreda and V. H. Agreda, "Designing Mixture Experiments", CHEMTECH (1989), vol. 19, No. 9, pp. 573–575.

U.S. patent application Ser. No. 09/682,920, Adedeji et al., filed Nov. 1, 2001.

E. J. Taylor, "A Mixture Experiment Approach to the Formulation of an SMC Low Profile Resin System", Polym.–Plast. Technol. Eng. (1984), vol. 22, No. 1, pp. 1–13.

E. E. Harrington, Jr., "The Desirability Function", Industrial Quality Control, vol. 21, No. 10, pp. 494–498. (1965).

G. Derringer and R. Suich, "Simultaneous Optimization of Several Response Variables", Journal of Quality Technology, vol. 12, No. 4, pp. 214–219 (1980).

A.I. Khuri and M. Conlon, "Simultaneous Optimization of Multiple Responses Represented by Polynomial Regression Functions", Technometrics, vol. 23, No. 4, pp. 363–375 (1981).

J. J. Pignatiello "Strategies for Robust Multiresponse Quality Engineering", IIE Transactions, vol. 25, No. 3, pp. 5–15 (1993).

J. L. Ribeiro and E. A. Elsayed, "A Case Study on Process Optimization Using the Gradient Loss Function", International Journal of Production Research, vol. 33, No. 12, pp. 3233–3248 (1995).

E. DelCastillo, D. C. Montgomery and D. R. McCarville, "Modified Desirability Functions for Multiple Response Optimization", Journal of Quality Technology, vol. 28, No. 3, pp. 337–345 (1996).

JP 06057008. Publication Date of Jan. 3, 1994. Abstract Only. 1 page.

U.S. patent application Ser. No. 09/682,919, Adedeji et al., filed Nov. 1, 2001.

U.S. patent application Ser. No. 09/682,921, Adedeji et al., filed Nov. 1, 2001.

U.S. patent application Ser. No. 09/682,923, Adedeji et al., filed Nov. 1, 2001.

U.S. patent application Ser. No. 09/682,926, Adedeji et al., filed Nov. 1, 2001.

U.S. patent application Ser. No. 09/682,928, Adedeji et al., filed Nov. 1, 2001.

U.S. patent application Ser. No. 09/682,929, Adedeji et al., filed Nov. 1, 2001.

U.S. patent application Ser. No. 10/063,336, Adedeji et al., filed Apr. 12, 2002.

Derwent Abstract for JP 58–93730.

Buna GmbH: "Werkstoff–Datenbank Campus Version 2 –S.2–3, 22–32" 1991, Buna GmbH, Schkopau XP002265739 (English Translation).

Baur Erwin: "Rechnergestutzte Werkstoffinformation systeme fur die Kunststofftechnik–S.44–67, 78–87, 94–99, 138–141" May 15 1998 (1988–05–15), Fakultat fur Maschinenwesen der Rheinisch–Westfalischen Technischen Hochschule Aachen, Aachen XP002265738 (English Translation).

Derringer G et al: "Simultaneous Optimization of Several Response Variables" Journal of Quality Technology, American Society for Quality Control, Milwaukee, US vol. 12, No. 4, Oct. 1980 (1980–10), pp. 214–219 (6 pages).

"Casip" Hoganas Powder News vol. 6, No. 1, 1990, XP002265950 Höganäs (1 page).

International Search Report: International Application No. PCT/US 03/02167; International Filing Date Jan. 24, 2003; Date of Mailing Jan. 22, 2004.

Baur Erwin: "Rechnergestützte Werkstoffinformationssysteme für die Kunststofftechnik–S. 44–67, 78–87, 94–99, 138–141"May 15, 1998 (1998–05–15), Fakultät Für Mashinenwesen Der Rheinisch–Westfalischen Technischen Hochschule Aachen, Aachen.

Buna GmbH: "Werkstoff–Datenbank Campus Version 2 –S.2–3, 22–32" 1991, Buna GmbH, Schkopau XP002265739.

WO 02 08983 A (Tokunaga Yumi; Goto Yasuo (JP); Iwaki Michio (JP); Shiseido Co LTD) Jan. 31, 2002 (2002–01–31) Abstract.

* cited by examiner

FIG. 6

SPECIFIC PROPERTIES

STIFFNESS
(Select at least one)

☒ Flexural Modulus, 23°C, ASTM D790
☐ Flexural Strength, 23°C, ASTM D790
☐ Tensile Modulus, 23°C, ASTM D638

IMPACT STRENGTH
(Select at least one)

☒ Notched Izod, 23°C, ASTM D256
☐ Unnotched Izod, 23°C, ASTM D256
☐ Dynatup Total Energy, 23°C, 7.5 mph, ASTM D3763

```
File  Edit  View  Go  Bookmarks  Options  Directory  Window  Help
http://www.
```

PROPERTY VALUES

[at least ▷]  Flexural Modulus, 23°C, ASTM D790 (kpsi)
200   240        350

[at least ▷]  Notched Izod Impact Strength, 23°C (ft-lb/in)
1.0   2.9        5.0

[Continue]

Document Done

mining a multi-component composition, and a computer data signal for determining a multi-component composition, are described below.

METHOD, SYSTEM, STORAGE MEDIUM, AND DATA SIGNAL FOR SUPPLYING A MULTI-COMPONENT COMPOSITION

BACKGROUND OF INVENTION

Various automated methods are known for selecting products based on customer preferences. In one approach, a customer is provided with a desired product by receiving the customer's preferences and comparing them with the characteristics of discrete products. For example, U.S. Pat. No. 5,056,029 to Cannon describes a method and apparatus for vending social expression cards by querying the customer to input a series of special occasion parameters, searching a database for card designs having special occasion parameters matching those input by the customer, and displaying the matching card designs.

In another approach, customer preferences and discrete product attributes are quantitatively correlated, leading to the suggestion of products having attributes that do not necessarily perfectly match the customer preferences. For example, U.S. Pat. No. 5,550,746 describes a method and apparatus for selecting social expression cards by quantitatively correlating product design characteristics with customer-entered selection criteria.

Both of the above approaches are useful for selecting from among combinations of discrete product attributes. However, some products cannot be characterized as combinations of discrete product attributes. For example, it would be desirable for a vendor to offer a multi-component composition in which amounts of components may be varied continuously, and in which the properties of the composition vary continuously with component amount variations. Such an approach would allow a customer to select a composition optimized for the customer's particular needs, rather than being restricted to selecting from a few discrete compositions.

There is therefore a need for an automated method and apparatus for specifying a multi-component composition based on customer-specified limitations on its properties.

SUMMARY OF INVENTION

The above-described and other drawbacks and disadvantages of the prior art are alleviated by a method for specifying a multi-component composition, comprising: receiving, from a user system, a first limitation on a first physical property and a second limitation on a second physical property; determining a recommended composition by searching a first continuous surface relating the first physical property to at least two compositional variables to determine first compositions that satisfy the first limitation, searching a second continuous surface relating the second physical property to at least two compositional variables to determine second compositions that satisfy the second limitation, determining an intersection of the first compositions and the second compositions, and selecting the recommended composition from the intersection of the first compositions and the second compositions; predicting a value of the first physical property and a value of the second physical property for the recommended composition; and presenting, to the user system, the value of the first physical property and the value of the second physical property for the recommended composition.

Other embodiments, including a system for specifying a multi-component composition, a storage medium encoded with machine-readable computer program code for determining a multi-component composition, and a computer data signal for determining a multi-component composition, are described below.

BRIEF DESCRIPTION OF DRAWINGS

Referring now to the drawings wherein like elements are numbered alike in several FIGURES:

FIG. 2 depicts an exemplary user interface for logging in;

FIG. 6 depicts an exemplary user interface wherein the option of selecting at least two specific physical properties is provided;

FIG. 7 depicts an exemplary user interface for a Physical Property Limitation sub-module wherein limitations on two physical properties are selected using slider bars;

DETAILED DESCRIPTION

Figure 1:
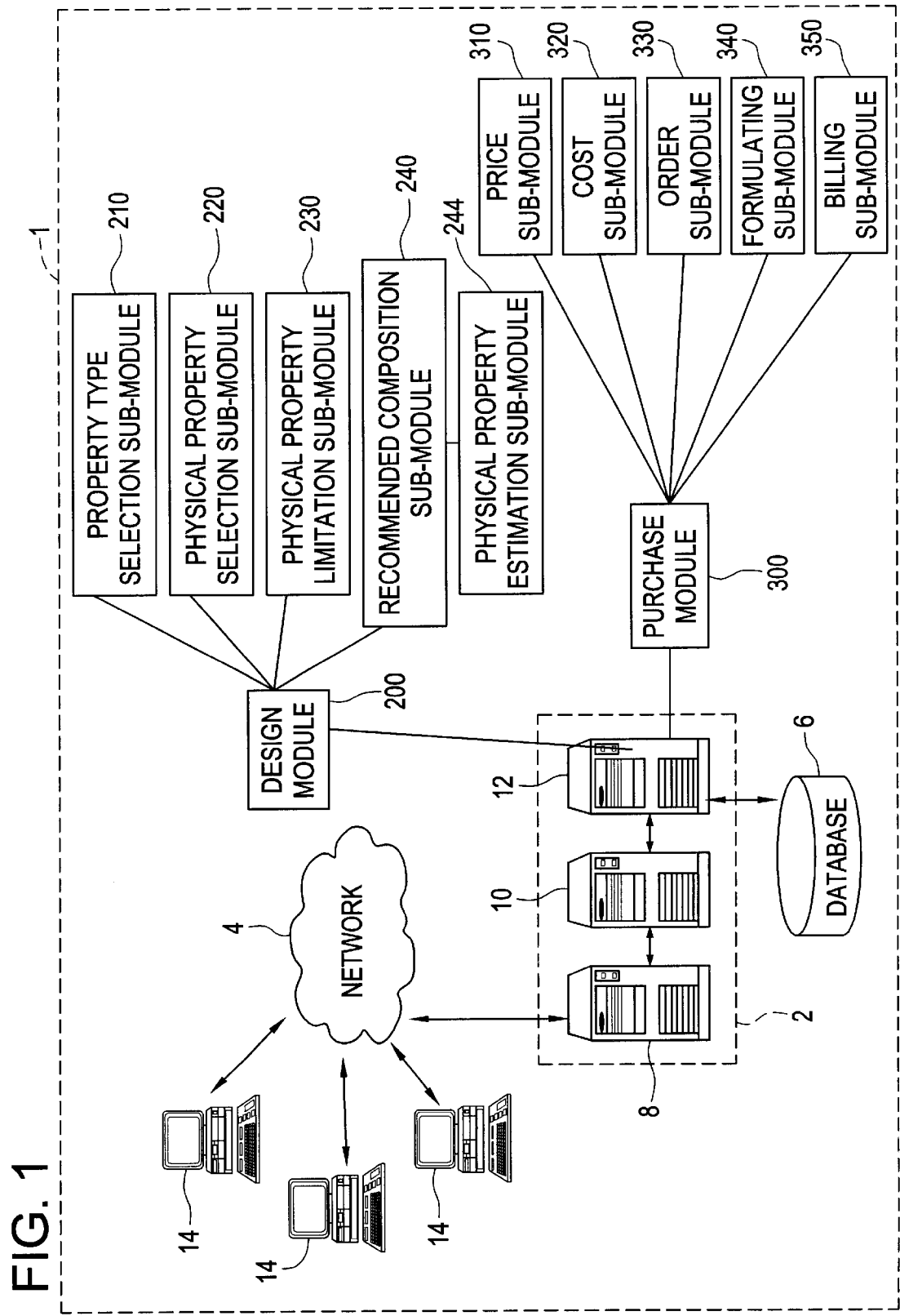
FIG. 1 is a block diagram of a system for specifying a multi-component composition.

FIG. 1 depicts a block diagram of one embodiment of a system for specifying a multi-component composition without human intervention. The system includes a host system 2 and a network 4. One or more user systems 14 may be coupled to the host system 2 via the network 4. Each user system 14 may be implemented using a general-purpose computer executing a computer program for carrying out the process described herein. The network 4 may be any type of known network including a local area network (LAN), wide area network (WAN), global network (e.g., Internet), intranet, or the like. Each user system 14 and the host system 2 may be connected to the network 4 in a wireless fashion and network 4 may be a wireless network. In another embodiment, the network 4 is the Internet and each user system 14 executes a user interface application (e.g., web browser) to contact the host system 2 through the network 4. Alternatively, the user system 14 may be implemented using a device programmed primarily for accessing network 4 such as WebTV.

The host system 2 may include one or more servers. In one embodiment, a network server 8 (often referred to as a web server) may communicate with the user systems 14. The network server 8 may be implemented using commercially available servers as are known in the art. The network server 8 handles sending and receiving information to and from user systems 14 and can perform associated tasks. The host system 2 may also include a firewall server 10 to (a) prevent unauthorized access to the host system 2; and (b) with respect to individuals/companies that are authorized access to the host system 2, enforce any limitations on the authorized access. For instance, a system administrator typically may have access to the entire system and have authority to update portions of the system. By contrast, a user contacting the host system 2 from a user system 14 would have access to use applications provided by applications server 12 but not alter the applications or data stored in database 6. The firewall server 10 may be implemented using conventional hardware and/or software as is known in the art.

The host system 2 may include an applications server 12. Applications server 12 may execute a plurality of software applications or modules as shown in FIG. 1. The applications may, for example, include a Design module 200 and a Purchase module 300. The modules may contain sub-modules as described below. The module serves as a tool that aids users at user systems 14 in the development of products as described herein. The modules may be implemented through a computer program or programs. The computer programs that implement the module may be stored on applications server 12 or may be stored in a location remote from applications server 12. Alternatively, more than one applications server may be used to execute the software module.

The applications server 12 may be coupled to a storage device, for example database 6. Database 6 may contain a variety of information used by the software module. In an exemplary embodiment, the system may be directed to aiding potential customers develop a multi-component thermoplastic product from a specification of at least two limitations on physical properties. In this embodiment, the operator of the host system 2 may be a plastics supplier.

Operation of the system will now be described. In an exemplary embodiment, the user system 14 may include a user interface application (e.g., a web browser), which allows the user system 14 to contact the host system 2 via network 4 (e.g., the Internet). An embodiment of the host system 2 may include a preloader for detecting the connection speed of the user system 14, and adjusting for optimal loading speed by switching between high band and low band loading (e.g., disabling animation for slow connections). In one embodiment, illustrated in FIG. 2, once the user system 14 contacts the host system 2, the host system 2 may require the user to log in by providing a user ID and password, or, if such an ID and password have not already been assigned, to create them. This log-in procedure assures that the user is permitted to access the host system 2 and provides control on the level of access (e.g., existing customer versus potential new customer).

Figure 3:
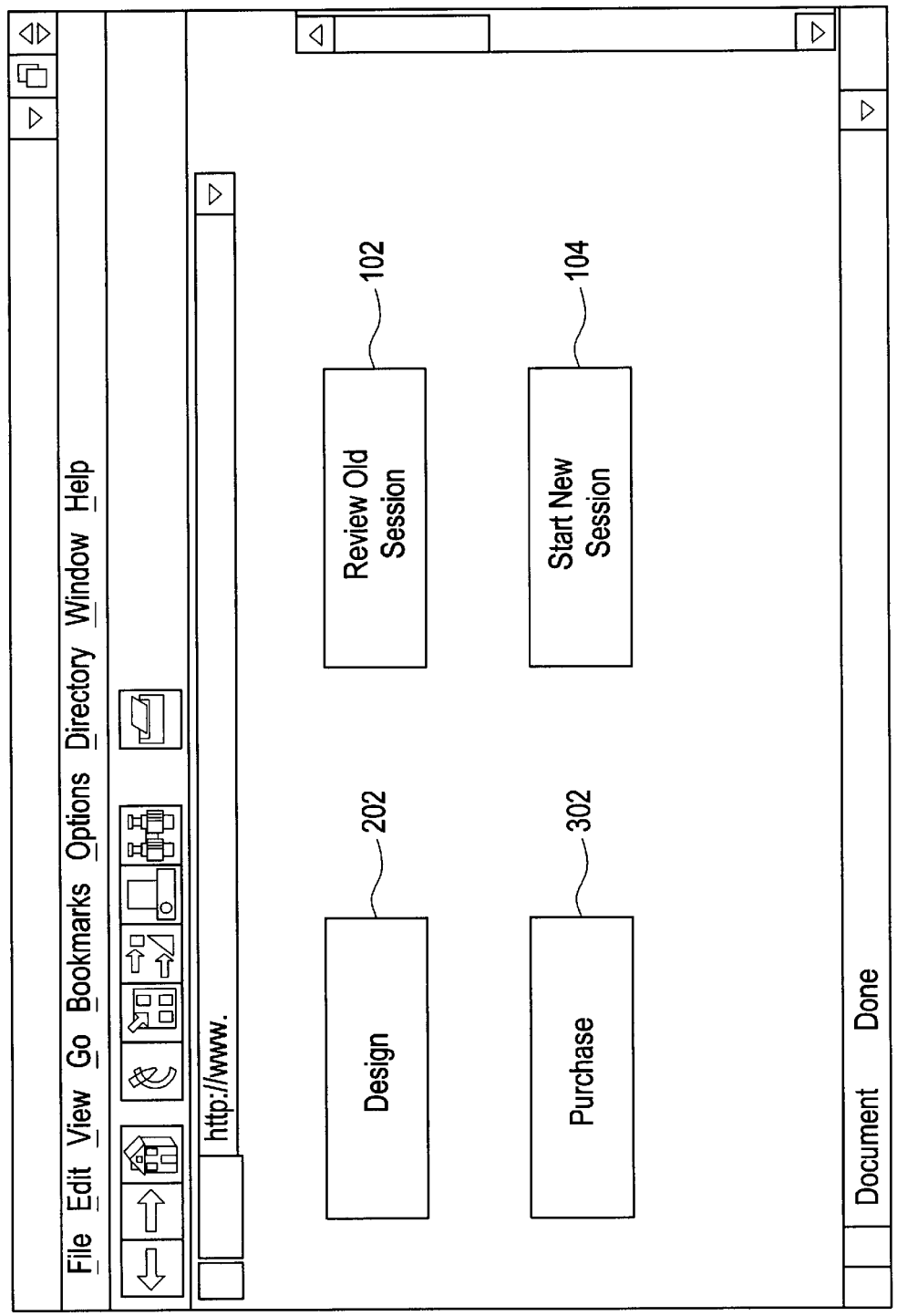
FIG. 3 depicts an exemplary user interface for a main screen offering design and purchase modules, as well as the options of reviewing an old session or starting a new session.

As illustrated in FIG. 3, after verifying a user ID and password, the user system 14 allows the user to review the physical properties and price of a multi-component composition from a previous session, and to continue with that session or begin a new session. Therefore, the user system 14 may be offered a choice of reviewing and continuing with a previous session by clicking the review old session button 102, or beginning a new session using the start new session button 104.

In embodiments including a user log in procedure, once the user has entered a valid user ID and password, the user system 14 is presented with a main screen such as that shown in FIG. 3. In all embodiments, the user may request execution of a software module or sub-module by selecting the associated button using an input peripheral device such as a mouse, trackball, keyboard, etc. at the user system 14. Upon the user selecting a button, application server 12 executes the selected software module.

The host system 2 may provide the user system 14 with a predefined list of user applications to facilitate the selection process (e.g., literature, design help, material selection and technical assistance). A link for contacting a person for assistance may be presented.

The design module may include photographic, video, audio and/or animated information and examples. Note that video and/or animated examples may be more helpful than merely reading the related information. Additionally, as discussed previously for the preloader function, the photographic, video, audio and/or animated information and examples may detect for slow user system 14 performance and adjust or disable the corresponding photographic, video, audio and/or animated information and examples.

Figure 4:
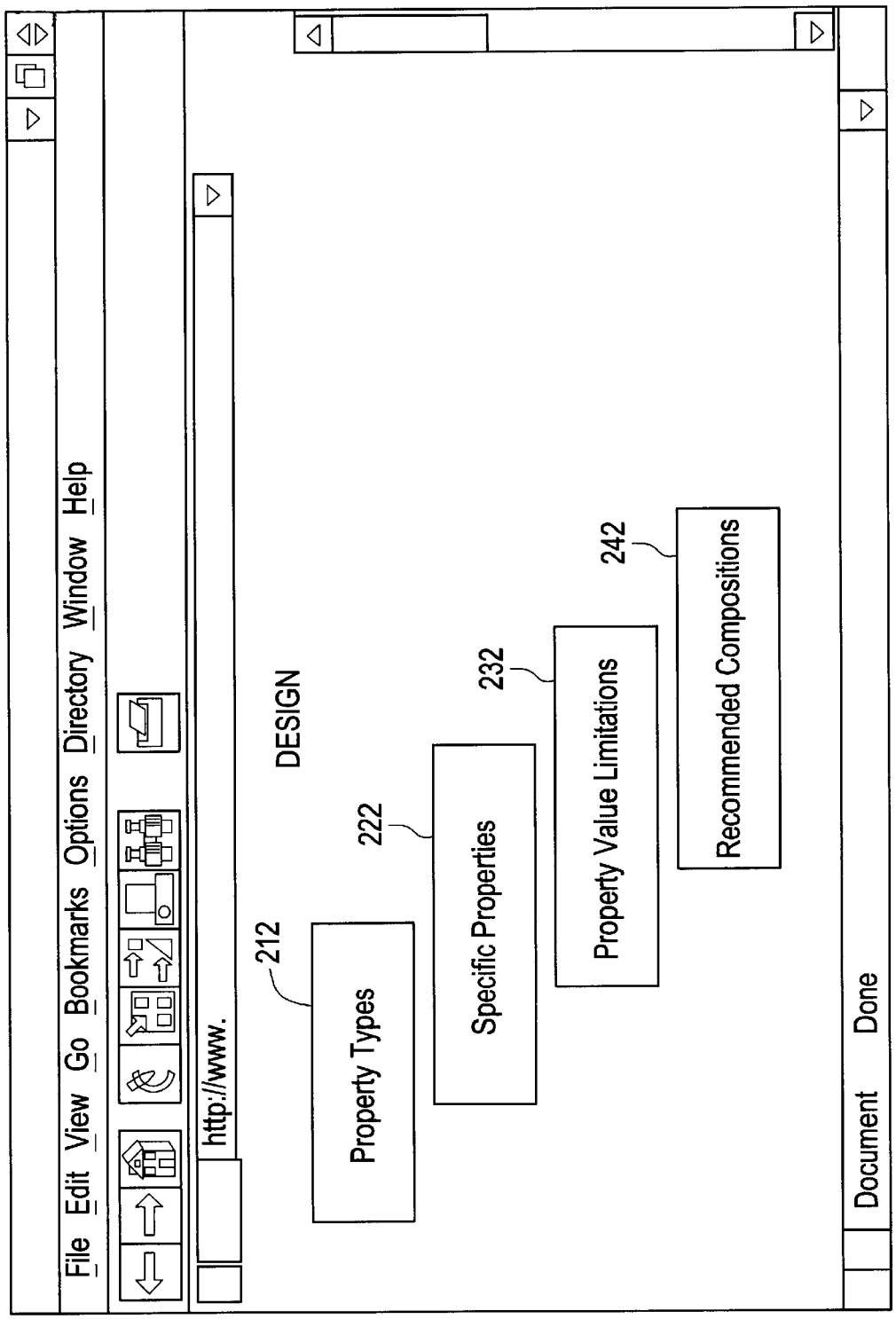
FIG. 4 depicts an exemplary user interface for a design main screen.

Turning to the Design module 200, one embodiment may include the host system 2 presenting the user system 14 with selections for user applications to facilitate developing multi-component composition. The Design module 200, along with its sub-modules (as described below), may provide varying output depending upon the user application. Accordingly, the user will be presented with information regarding materials and requirements associated therewith. Referring to FIG. 3, if the user selects the design button 202, the Design module 200 is launched and the user system 14 is presented with a design main screen as shown in FIG. 4. Referring to FIGS. 1 and 4, the Design module 200 may contain, among others, a Property Type Selection sub-module 210 (selected via Property Types Button 212), a Physical Property Selection sub-module 220 (selected via Specific Properties Button 222), a Physical Property Limitation sub-module 230 (selected via Property Value Limitations Button 232), and a Recommended Composition sub-module 240 (selected via Recommended Compositions Button 242). Not depicted in FIG. 4 but also present within the Recommended Composition sub-module 240 is a Physical Property Estimation sub-module 244.

Figure 5:
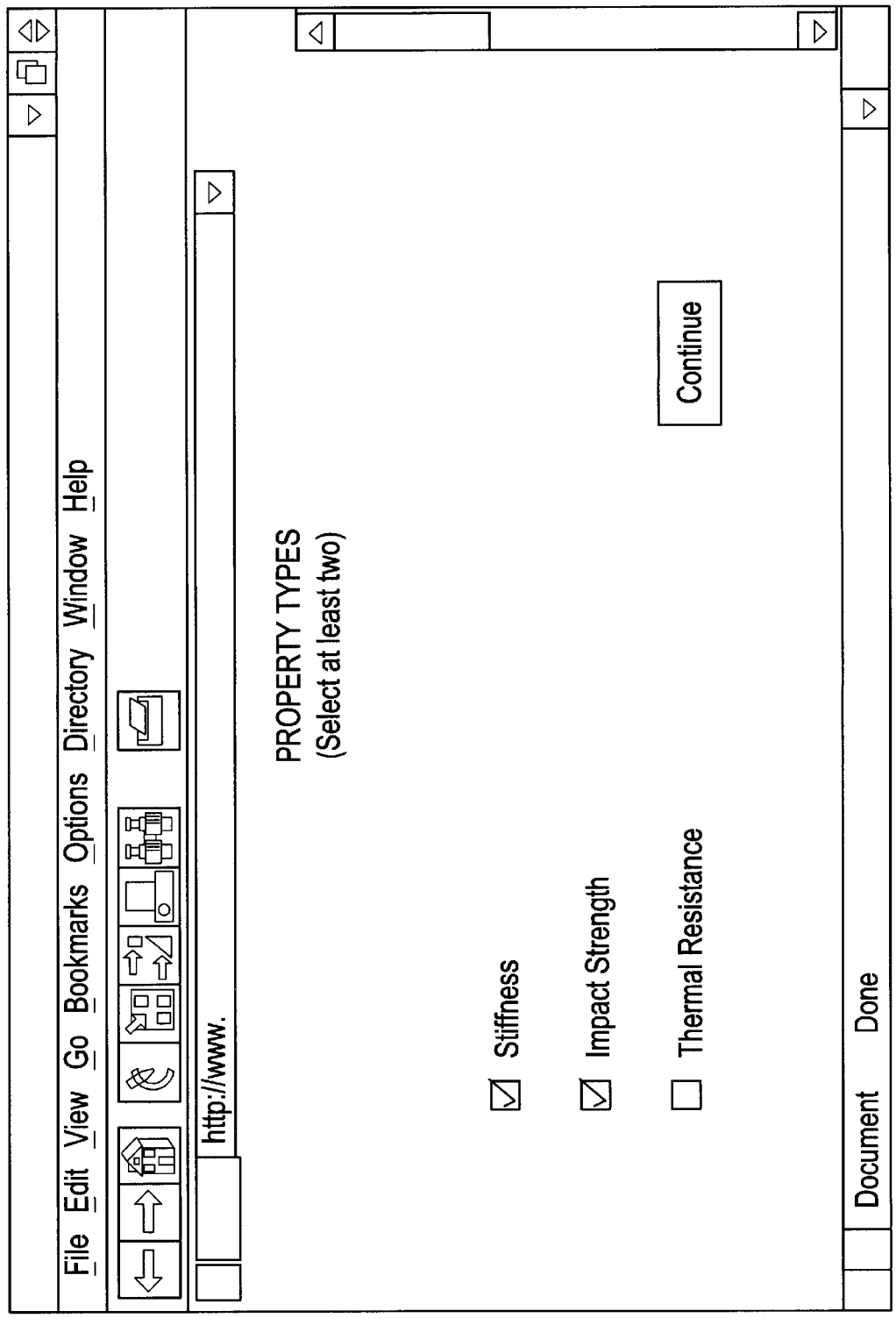
FIG. 5 depicts an exemplary user interface wherein the option of selecting at least two physical property types is provided.

The Property Type Selection sub-module 210 provides the user system 14 with an option to select at least two subjective physical property types (FIG. 5). In a preferred embodiment, the method of specifying a multi-component composition is for a multi-component thermoplastic or thermoset composition. In still another embodiment the thermoplastic composition is a thermoplastic blend or alloy. Preferred physical property types of a thermoplastic composition include, for example, stiffness, impact strength, thermal resistance, flammability, chemical resistance, light resistance, and the like. The user may, for example, select two or more physical property types by clicking on checkmark boxes next to the presented properties.

Upon the selection of the physical property types the Physical Property Selection sub-module 220 is launched and provides the user system 14 with the selection of an specific (objective) physical property based upon the previously selected subjective physical property types. In the thermoplastic embodiment, the physical properties may be specific properties related to stiffness, impact strength, or thermal resistance of a thermoplastic blend or alloy. Specific physical properties may preferably be traceable to standard measurement protocols, such as those published by the American Society for Testing and Materials (ASTM) and the International Organization for Standardization (ISO). Physical properties relating to stiffness include flexural modulus and flexural strength (e.g., measured according to ASTM D790), and tensile modulus and tensile strength (e.g., measured according to ASTM D638). Physical properties relating to impact strength of a thermoplastic blend or alloy include notched and unnotched Izod (pendulum) impact strength (e.g., measured according to ASTM D256) and falling weight impact strength (e.g., measured according to ASTM D3763). Physical properties relating to thermal resistance of a thermoplastic blend or alloy include heat distortion temperature (HDT) at various pressures (e.g., measured according to ASTM D648), glass transition temperature (e.g., measured according to ASTM D3418), and coefficient of thermal linear expansion (e.g., measured determined according to ASTM D6341). Another physical property of interest is specific gravity (e.g., measured according to ASTM D792). FIG. 6 depicts a design screen provided to the user system 14 for the option of selecting at least two specific properties of interest.

The selection of property values and the subsequent estimation of properties for recommended compositions utilize continuous mathematical models, each model correlating the values of a specific property to compositional variable, such as the amounts of variable components. Such models may be theoretical, but they are preferably empirical models derived from experimental designs in which compositional variable are systematically varied and property values of the resulting compositions are measured. Methods of designing and analyzing such experiments are known in the art and described, for example, in G. E. P. Box, W. G. Hunter, and J. S. Hunter, "Statistics for Experiments; An Introduction to Design, Data Analysis, and Model Building", New York: Wiley-Interscience (1978). Design and analysis of mixture experiments are described, for example, in C. L. Agreda and V. H. Agreda, *CHEMTECH* (1989), volume 19, no. 9, pages 573–5; and E. J. Taylor, *Polym.—Plast. Technol. Eng.* (1984), volume 22, no. 1, pages 1–13. In a preferred embodiment, the mathematical model is an equation of the form $$y = (a+\alpha) + (b+\beta)x_1 + (c+\gamma)x_2 + \ldots + (z+\omega)x_n$$

where y is the value of a property; a is the intercept, and $\alpha$ is the uncertainty (e.g., standard deviation) associated with the intercept; b, c, . . . , z are coefficients associated with compositional variables $x_1, x_2, \ldots, x_n$, respectively; and $\beta$, $\gamma$, . . . , $\omega$ are uncertainties (e.g., standard deviations) associated with coefficients b, c, . . . , z, respectively. The mathematical model may, optionally, comprise higher order terms such as squared terms in one variable and cross-terms of two or more variables. Specific examples of mathematical models are presented in the examples, below.

The equation above with coefficients $x_1$ to $x_n$ thus represents an n-dimensional surface. Once the surface is defined by such an equation, it can be searched using known methods to define compositional ranges satisfying a property limitation, or used to estimate properties of a recommended composition, as explained below.

Figure 8:
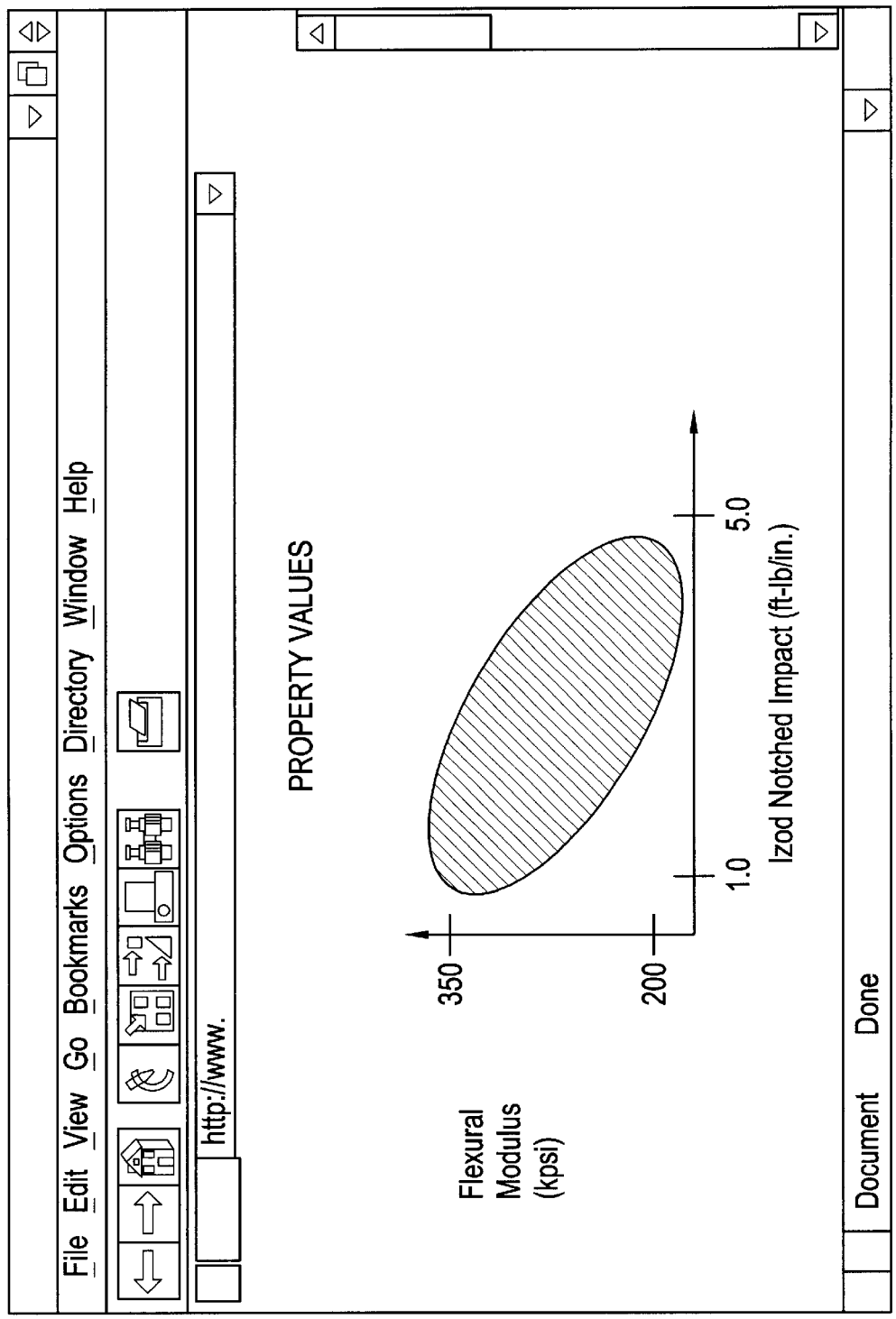
FIG. 8 depicts an exemplary user interface for a Physical Property Limitation sub-module wherein limitations on two physical properties are selected using a two-dimensional plot of attainable property combinations.

Once at least two specific properties of interest have been selected, the user system 14 prompts the user for value limitations on those properties. In one embodiment, for each property of interest, the user may simply enter a specific value, corresponding to an upper or lower limit for the property value. For example, a user may specify a Notched Izod Impact Strength at 23° C. of at least about 4.0 foot-pounds per inch. In a preferred embodiment, the user system 14 presents a range of property values attainable by the composition and allows the user to select a particular value within the attainable range. The attainable range of values for one property may be presented, for example, as a slider bar that the user can manipulate to select a limitation. Preferably, slider bars are presented for each properties of interest, and the selection of a limitation for one property will cause the attainable ranges of other property values to be recalculated and displayed in view of the additional constraint. Thus, a user may use an input peripheral device to select property limitations in order of the relative importance of the properties. This embodiment is illustrated in FIG. 7. Alternatively, the attainable range of values for a pair of properties may be presented as a two dimensional plot of attainable property combinations. This embodiment is illustrated in FIG. 8. The user may select a property combination by using an input peripheral device to select a point within the shaded area representing attainable combinations of property values. Once limitations have been selected for at least two properties, limitations for additional properties may optionally be selected using similar techniques.

Note that each property limitation may include a continuous numerical value as well as an inequality (e.g., "at least", "up to", "less than", "greater than"). As shown in FIG. 8, the user system 14 may present the most likely inequality and allow the user to select an alternative inequality via, for example, a pull-down menu. It is important to note that a property value may include a non-numerical value. For example, flammability may be specified as the probability of achieving an Underwriter's Laboratory UL-94 rating of V0. In this case, the probability is a continuous numerical value, but the property itself is expressed as a discrete rating. Methods for determining the probability of achieving a particular discrete property rating are described, for example, in U.S. Pat. No. 6,308,142 to Choate et al.

Although determination of a recommended composition utilizes limitations on at least two physical properties, it may, optionally, further utilize limitations related to non-physical properties, notably price. Determination of a recommended composition may also, optionally, further utilize limitations on discrete variables, such as a requirement that the composition include only FDA approved components.

Upon receiving the selection from user system 14 of a first limitation on a first physical property and a second limitation on a second physical property, Recommended Composition sub-module 240 is launched and a recommended composition is determined by searching a first continuous surface relating the first physical property to at least two compositional variables to determine first compositions that satisfy the first limitation; searching a second continuous surface relating the second physical property to at least two compositional variables to determine second compositions that satisfy the second limitation; determining an intersection of the first compositions and the second compositions; and selecting a recommended composition from the intersection of the first compositions and the second compositions. Values of the first physical property and the second physical property for the recommended composition are then calculated. Host system 2 presents, for display at a user system 14, the properties associated with at least one recommended composition. In a preferred embodiment, the property values of the recommended composition are presented without presenting the composition itself. In another embodiment, the composition may be displayed in coded form. For example, specific components may be represented by the letters A, B, C, etc., and component amounts may be represented by a relative scale of 0 to 1. The recommended composition may be used to estimate and present, via user system 14, values of additional properties.

Searching the first and second continuous surfaces for compositions satisfying their particular limitations may be conducted using methods known in the art. Such methods may be conveniently employed using commercially available design and analysis software such as, for example, DESIGN EXPERT® 6.0 available from Stat-Ease Inc, MINITAB® 13 available from Minitab, Inc., and JMP® 4 available from SAS Institute Inc; the methods may also be found within spreadsheet software such as, for example, EXCEL® 2000 available from Microsoft Corporation. Methods of simultaneously optimizing multiple responses are also described in, for example, E. E. Harrington, Jr., "The Desirability Function", *Industrial Quality Control*, vol. 21, no. 10, pp. 494–498 (1965); G. Derringer and R. Suich, "Simultaneous Optimization of Several Response Variables", *Journal of Quality Technology*, vol. 12, no. 4, pp. 214–219 (1980); A. I. Khuri and M. Conlon, "Simultaneous Optimization of Multiple Responses Represented by Polynomial Regression Functions", *Technometrics*, vol. 23, no. 4, pp. 363–375 (1981); J. J. Pignatiello "Strategies for Robust Multiresponse Quality Engineering", *IIE Transactions*, vol. 25, no. 3, pp. 5–15 (1993); J. L. Ribeiro and E. A. Elsayed, "A Case Study on Process Optimization Using the Gradient Loss Function", *International Journal of Production Research*, vol. 33, no. 12, pp. 3233–3248 (1995); and E. DelCastillo, D. C. Montgomery and D. R. McCarville, "Modified Desirability Functions for Multiple Response Optimization", *Journal of Quality Technology*, vol. 28, no. 3, pp. 337–345 (1996). It will be understood that the first and second continuous surfaces may be searched simultaneously. For example, the method may employ an algorithm that searches graphically or numerically for compositions (i.e., combinations of allowed compositional variable values) that simultaneously satisfy the first and second limitations.

Determining the intersection of the first compositions and the second compositions is performed by comparing their respective compositional limitations and selecting the subset of compositions that satisfies both sets of compositional limitations.

Figure 9:
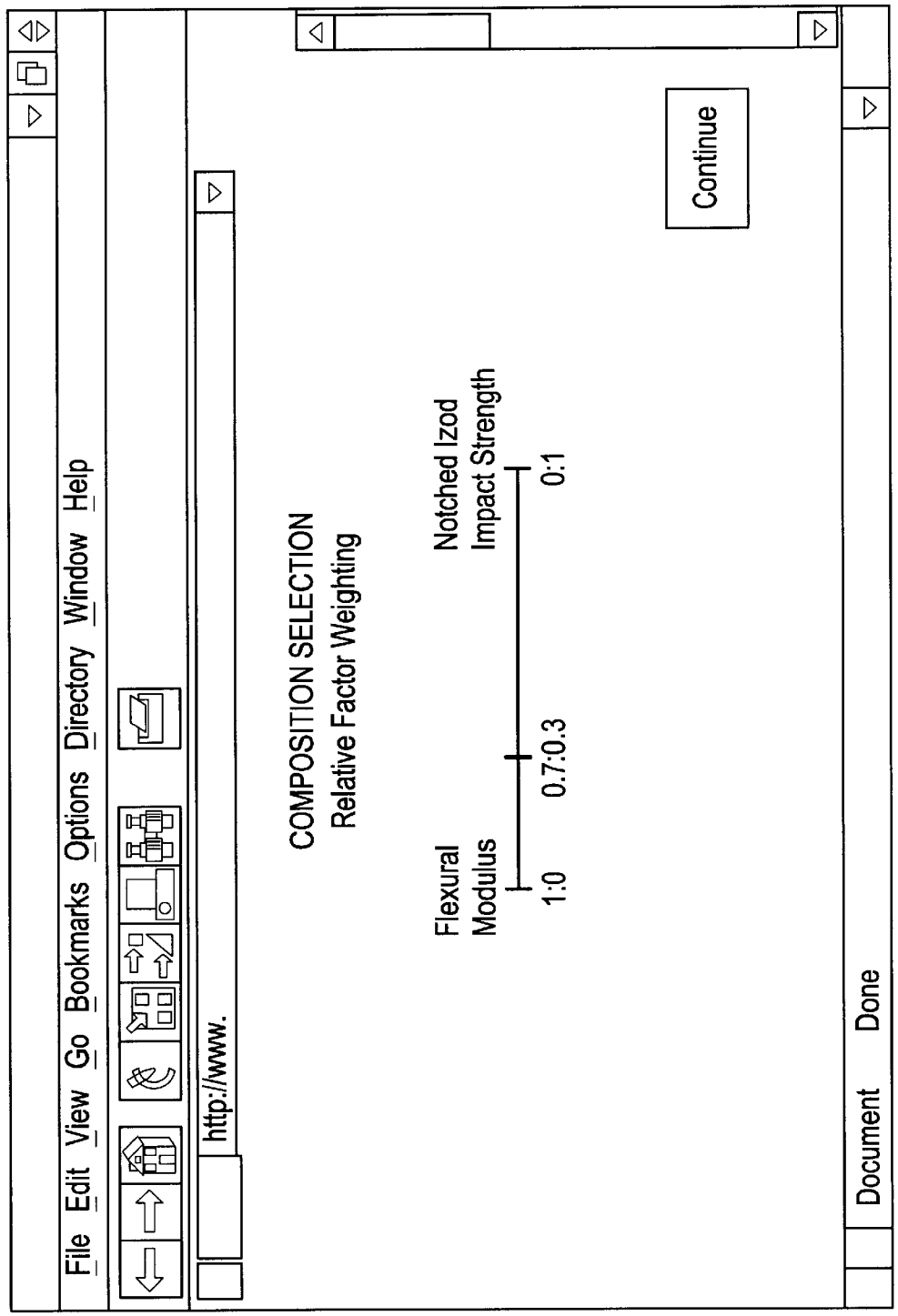
FIG. 9 depicts an exemplary user interface for weighting the importance of the first property and the second property in selecting the recommended composition.

There are various options for selecting a recommended composition from the intersection of the first compositions and the second compositions. In one embodiment, the user interface presents a means for weighting the importance of the first property and the second property. For example, the user interface could offer the option of selecting a recommended composition by optimizing the value of the first property. This could be achieved, for example, with a sliding bar, as illustrated in FIG. 9. In another embodiment, the user interface presents a means for adding constraints related to one or more additional properties. These may be additional physical properties, or non-physical properties such as price. This embodiment could employ methods similar to those used for selection of property types, specific properties, and property limitations for the first and second physical property.

In one embodiment, the Physical Property Limitation Sub-Module 230 and/or the Recommended Composition Sub-Module 240 may utilize more than one mathematical model for a given property. For example, when presenting attainable values of flexural modulus for a thermoplastic composition, the Physical Property Limitation Sub-Module 230 may utilize one model corresponding to unfilled compositions, and another model corresponding to glass-fiber filled compositions. In cases where property limitations are met by spaces covered by each model, compositions may be recommended based on either or both models.

As mentioned above, creation of the continuous mathematical models for property values as a function of composition may include determination of statistical uncertainties associated with various terms in the model, as illustrated in Example 1, below.

These uncertainties may, optionally, be employed in the selection of a recommended composition. In one embodiment, the uncertainties associated with property values may simply be displayed, via user interface 14, in association with property values used for selecting property limitations or with property values estimated for a recommended composition. For example, the estimated flexural modulus value of a recommended composition may be displayed as 623±25 kpsi rather than 623 kpsi, where 25 kpsi is the standard deviation associated with the mean value of 623 kpsi. In another embodiment, the uncertainties can provide additional options for the expression of an inequality. For example, statistical uncertainties may be used to express and utilize a flexural modulus limitation as "90% probability of achieving a Flexural modulus of at least 600 kpsi", rather than "at least 600 kpsi".

Figure 10:
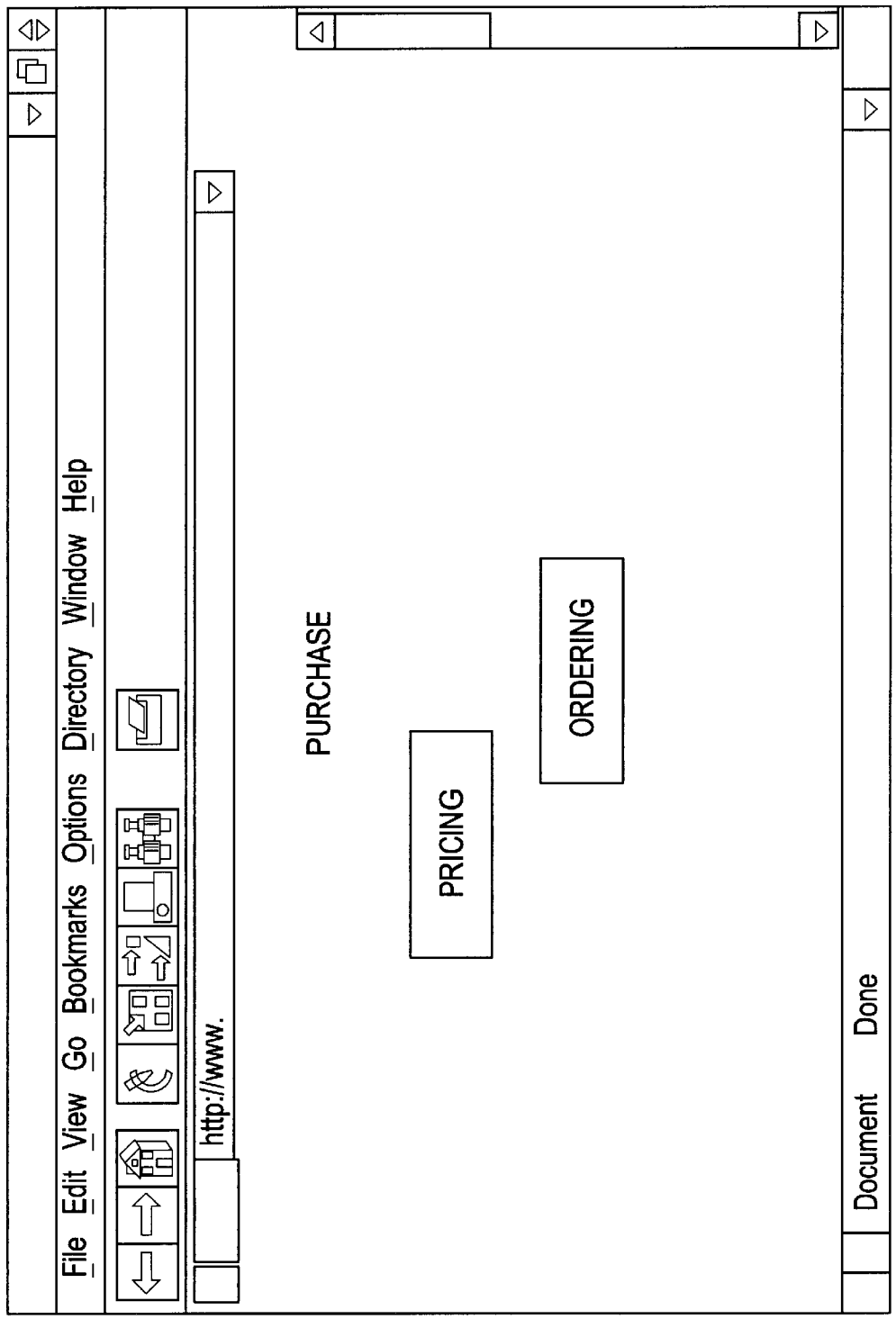
FIG. 10 depicts an exemplary user interface for a Purchase module for providing purchasing information.

Turning to the Purchase Module 300, one embodiment may include the host system 2 presenting the user system 14 with selections for user applications to facilitate purchasing a multi-component composition after its selection by any of the above methods. An example of a user interface for a Purchase module for providing purchasing information is depicted in FIG. 10. The Purchase module 300 may contain, among others, Price Sub-Module 310, Cost Sub-Module 320, Sub-Module 330, Formulating Sub-Module 340, and Billing Sub-Module 350.

Upon the determination of a recommended composition from the intersection of the first composition and the second composition, Price sub-module 310 and Cost sub-module 320 are launched and the price and cost for a minimum order, for example 5,000 pounds, of the recommended compositions are calculated. The price may be presented to the user system 14 by the host system 2. The cost, price, and calculated physical property values are automatically updated as the recommended compositions change by adjustments of the slider bars and/or further selections on the two-dimensional property plots. Any method known in the art for calculating prices and costs may be employed. In a preferred embodiment, a plurality of prices varying as a function of order quantity may be presented. A minimum order quantity may also be presented.

Once a recommended composition is chosen by the user, Order Sub-Module 330 is launched to aid the user system 14 in the purchase of a quantity of the recommended composition. A request for an amount of the composition is presented to the user system 14. The price of the selected amount is presented to the user system 14. A component inventory system or manufacturing facility may, optionally, be advised by the launching of Formulating Sub-Module 340 in the event of receiving an order for an amount of the recommended composition from the user system 14. The contracted amount of the recommended composition is billed to an entity specified by the user interface system 14 through the launching of Billing Sub-Module 350. In a preferred embodiment, the method described herein to specify a multi-component composition is conducted without human intervention.

In one embodiment, a link for contacting a person for assistance is presented to the user system 14 at select user interfaces.

In addition to specifying the component amounts of the multi-component composition, the method may further comprise determining conditions for preparing the composition. For example, when the composition is a thermoplastic blend, the method may comprise determining a sequence of addition of the components, the extrusion conditions, or the like.

In another embodiment, the method may further comprise generating a product datasheet with properties of the composition and recommendations for its use. For example, when the composition is a thermoplastic blend, the datasheet may include recommended molding conditions.

In a preferred embodiment, the multi-component composition is a thermoplastic blend.

In a more preferred embodiment, the multi-component composition is a thermoplastic blend comprising a polyolefin and a poly(arylene ether). Such thermoplastic blends are hereinafter called PO/PPE blends.

The polyolefin in the PO/PPE blends may be a homopolymer or copolymer having at least about 80 weight percent of units derived from polymerization of ethylene, propylene, butylene, or a mixture thereof. Examples of polyolefin homopolymers include polyethylene, polypropylene, and polybutylene. Examples of polyolefin copolymers include random, graft, and block copolymers of ethylene, propylene, butylene, and octylene with each other, and further comprising up to 20 weight percent of units derived from $C_5$–$C_{10}$ alpha olefins (excluding aromatic alpha-olefins). Polyolefins further include blends of the above homopolymers and copolymers. Preferred polyolefins may have a flexural modulus of at least about 100,000 pounds per square inch (psi) at 23° C. as measured according to ASTM D790. Suitable polyolefins ay comprise, for example, the linear low density polyethylene available from ExxonMobil as LL-6201, the low density polyethylene available from ExxonMobil as LMA-027, the high density polyethylene available from ExxonMobil as HD-6605, the ultra-high molecular weight polyethylene available as Type 1900 from Montell Polyolefins, and the polybutylene (polybutene-1) available as PB0110 from Montell Polyolefins.

Presently preferred polyolefins include propylene polymers. The propylene polymer may be a homopolymer of polypropylene. Alternatively, the propylene polymer may be a random, graft, or block copolymer of propylene and at least one olefin selected from ethylene and $C_4$–$C_{10}$ alpha-olefins (excluding aromatic alpha-olefins), with the proviso that the copolymer comprises at least about 80 weight percent, preferably at least about 90 weight percent, of repeating units derived from propylene. Blends of such propylene polymers with a minor amount of another polymer such as polyethylene are also included within the scope of propylene polymers. The propylene polymer may have a melt flow index of about 0.1 to about 50 g/10 min, preferably about 1 to about 30 g/10 min when measured according to ASTM D1238 at 2.16 kg and 200° C. The above-described propylene polymers can be produced by various known processes. Commercially available propylene polymers may also be employed.

Preferred propylene polymers include homopolypropylenes. Highly preferred propylene polymers include homopolypropylenes having a crystalline content of at least about 20%, preferably at least about 30%. Suitable isotactic polypropylenes are commercially available as, for example, PD403 pellets from Basell (formerly Montell Polyolefins of North America).

The PO/PPE blends may comprise polyolefin in an amount of about 10 to about 80 weight percent, preferably about 10 to about 70 weight percent, more preferably about 10 to about 60 weight percent, based on the total weight of the composition.

The PO/PPE blends may comprise any poly(arylene ether). The term poly(arylene ether) includes polyphenylene ether (PPE) and poly(arylene ether) copolymers; graft copolymers; poly(arylene ether) ether ionomers; and block copolymers of alkenyl aromatic compounds, vinyl aromatic compounds, and poly(arylene ether), and the like; and combinations comprising at least one of the foregoing; and the like. Poly(arylene ether)s are known polymers comprising a plurality of structural units of the formula

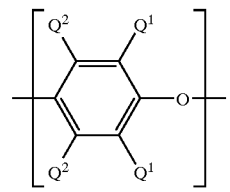

wherein for each structural unit, each $Q^1$ is independently halogen, primary or secondary $C_1$–$C_8$ alkyl, phenyl, $C_1$–$C_8$ haloalkyl, $C_1$–$C_8$ aminoalkyl, $C_1$–$C_8$ hydrocarbonoxy, or $C_2$–$C_8$ halohydrocarbonoxy wherein at least two carbon atoms separate the halogen and oxygen atoms; and each $Q^2$ is independently hydrogen, halogen, primary or secondary $C_1$–$C_8$ alkyl, phenyl, $C_1$–$C_8$ haloalkyl, $C_1$–$C_8$ aminoalkyl, $C_1$–$C_8$ hydrocarbonoxy, or $C_2$–$C_8$ halohydrocarbonoxy wherein at least two carbon atoms separate the halogen and oxygen atoms. Preferably, each $Q^1$ is alkyl or phenyl, especially $C_{1-4}$ alkyl, and each $Q^2$ is independently hydrogen or methyl.

Both homopolymer and copolymer poly(arylene ether)s are included. The preferred homopolymers are those comprising 2,6-dimethylphenylene ether units. Suitable copolymers include random copolymers comprising, for example, such units in combination with 2,3,6-trimethyl-1,4-phenylene ether units or copolymers derived from copolymerization of 2,6-dimethylphenol with 2,3,6-trimethylphenol. Also included are poly(arylene ether)s containing moieties prepared by grafting vinyl monomers or polymers such as polystyrenes, as well as coupled poly(arylene ether) in which coupling agents such as low molecular weight polycarbonates, quinones, heterocycles and formals undergo reaction in known manner with the hydroxy groups of two poly(arylene ether) chains to produce a higher molecular weight polymer. Poly(arylene ether)s of the present invention further include combinations of any of the above.

The poly(arylene ether) generally has a number average molecular weight of about 3,000 to about 40,000 atomic mass units (AMU) and a weight average molecular weight of about 20,000 to about 80,000 AMU, as determined by gel permeation chromatography. The poly(arylene ether) generally may have an intrinsic viscosity of about 0.1 to about 0.6 deciliters per gram (dL/g) as measured in chloroform at 25° C. Within this range, the intrinsic viscosity may preferably be up to about 0.5 dL/g, more preferably up to about 0.47 dL/g. Also within this range, the intrinsic viscosity may preferably be at least about 0.2 dL/g, more preferably at least about 0.3 dL/g. It is also possible to utilize a high intrinsic viscosity poly(arylene ether) and a low intrinsic viscosity poly(arylene ether) in combination. Determining an exact ratio, when two intrinsic viscosities are used, will depend on the exact intrinsic viscosities of the poly (arylene ether)s used and the ultimate physical properties desired.

The poly(arylene ether)s are typically prepared by the oxidative coupling of at least one monohydroxyaromatic compound such as 2,6-xylenol or 2,3,6-trimethylphenol.

Catalyst systems are generally employed for such coupling; they typically contain at least one heavy metal compound such as a copper, manganese or cobalt compound, usually in combination with various other materials.

Particularly useful poly(arylene ether)s for many purposes include those that comprise molecules having at least one aminoalkyl-containing end group. The aminoalkyl radical is typically located in an ortho position relative to the hydroxy group. Products containing such end groups may be obtained by incorporating an appropriate primary or secondary monoamine such as di-n-butylamine or dimethylamine as one of the constituents of the oxidative coupling reaction mixture. Also frequently present are 4-hydroxybiphenyl end groups, typically obtained from reaction mixtures in which a by-product diphenoquinone is present, especially in a copper-halide-secondary or tertiary amine system. A substantial proportion of the polymer molecules, typically constituting as much as about 90% by weight of the polymer, may contain at least one of the aminoalkyl-containing and 4-hydroxybiphenyl end groups.

The PO/PPE blends may comprise poly(arylene ether) in an amount of about 10 to about 55 weight percent, based on the total weight of the composition. Within this range, it may be preferred to use the poly(arylene ether) in an amount of at least about 15 weight percent, more preferably at least about 18 weight percent. It may also be preferred to use the poly(arylene ether) in an amount of up to about 55 weight percent, more preferably up to about 50 weight percent.

In a highly preferred embodiment, the multi-component composition is a PO/PPE blend further comprising at least one additional component selected from a poly(alkenyl aromatic) resin, a hydrogenated block copolymer of an alkenyl aromatic compound and a conjugated diene, an unhydrogenated block copolymer of an alkenyl aromatic compound and a conjugated diene, a polypropylene-polystyrene graft copolymer, a polyolefin-graft-cyclic anhydride copolymer, an ethylene/alpha-olefin elastomeric copolymer, a reinforcing filler, and the like, and combinations comprising at least one of the foregoing components. These components are fully described in U.S. application Ser. No. 09/682,920.

The term "poly(alkenyl aromatic) resin" as used herein includes polymers prepared by methods known in the art including bulk, suspension, and emulsion polymerization, which contain at least 25% by weight of structural units derived from an alkenyl aromatic monomer of the formula

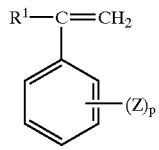

wherein $R^1$ is hydrogen, $C_1$–$C_8$ alkyl, halogen, or the like; Z is vinyl, halogen, $C_1$–$C_8$ alkyl, or the like; and p is 0 to 5. Preferred alkenyl aromatic monomers include styrene, chlorostyrenes such as p-chlorostyrene, and methylstyrenes such as p-methylstyrene. The poly(alkenyl aromatic) resins include homopolymers of an alkenyl aromatic monomer; random copolymers of an alkenyl aromatic monomer, such as styrene, with one or more different monomers such as acrylonitrile, butadiene, alpha-methylstyrene, ethylvinylbenzene, divinylbenzene and maleic anhydride; and rubber-modified poly(alkenyl aromatic) resins comprising blends and/or grafts of a rubber modifier and a homopolymer of an alkenyl aromatic monomer (as described above), wherein the rubber modifier may be a polymerization product of at least one $C_4$–$C_{10}$ nonaromatic diene monomer, such as butadiene or isoprene. The rubber-modified poly(alkenyl aromatic) resin may comprise about 98 to about 70 weight percent of the homopolymer of an alkenyl aromatic monomer and about 2 to about 30 weight percent of the rubber modifier. Within these ranges it may be preferred to use at least 88 weight percent of the alkenyl aromatic monomer. It may also be preferred to use up to about 94 weight percent of the alkenyl aromatic monomer. It may also be preferred to use at least 6 weight percent of the rubber modifier. It may also be preferred to use up to 12 weight percent of the rubber modifier.

The stereoregularity of the poly(alkenyl aromatic) resin may be atactic or syndiotactic. Highly preferred poly(alkenyl aromatic) resins include atactic and syndiotactic homopolystyrenes. Suitable atactic homopolystyrenes are commercially available as, for example, EB3300 from Chevron, and P1800 from BASF. Suitable syndiotactic homopolystyrenes are commercially available, for example, under the tradename QUESTRA® (e.g., QUESTRA® WA550) from Dow Chemical Company. Highly preferred poly(alkenyl aromatic) resins further include the rubber-modified polystyrenes, also known as high-impact polystyrenes or HIPS, comprising about 88 to about 94 weight percent polystyrene and about 6 to about 12 weight percent polybutadiene, with an effective gel content of about 10% to about 35%. These rubber-modified polystyrenes are commercially available as, for example, GEH 1897 from General Electric Plastics, and BA 5350 from Chevron.

When the poly(alkenyl aromatic) resin is present in the PO/PPE blend, it may be used in an amount of about 4 to about 46 weight percent, with the proviso that the poly(alkenyl aromatic) resin constitutes at least about 30 weight percent, of the total of the poly(arylene ether) and the poly(alkenyl aromatic) resin. Within this range, it may be preferable to use the poly(alkenyl aromatic) resin in an amount of at least about p6weight percent, based on the total weight of the PO/PPE blend.

In one embodiment, the amount of poly(alkenyl aromatic) resin may be expressed as a fraction of the total of poly(arylene ether) and poly(alkenyl aromatic) resin. The PO/PPE blend may preferably comprise poly(alkenyl aromatic) resin in an amount of about 30 to about 80 weight percent, based on the combined weight of poly(arylene ether) and poly(alkenyl aromatic) resin. Within this range, it may be preferred to use a poly(alkenyl aromatic) resin amount up to about 70 weight percent, more preferably up to about 65 weight percent. Also within this range, it may be preferred to use a poly(alkenyl aromatic) resin amount of at least about 35 weight percent, more preferably at least about 40 weight percent. When the amount of poly(alkenyl aromatic) resin is less than about 30 weight percent of the total of the poly(arylene ether) and poly(alkenyl aromatic) resin, the PO/PPE blend after molding may be deficient in flexural modulus. When the amount of poly(alkenyl aromatic) resin is greater than about 80 weight percent of the total of the poly(arylene ether) and poly(alkenyl aromatic) resin, the PO/PPE blend after molding may be deficient in heat distortion temperature. The proportions of poly(alkenyl aromatic) resin and poly(arylene ether) may be manipulated to control the glass transition temperature ($T_g$) of the single phase comprising these two components relative to the $T_g$ of the poly(arylene ether) alone, or relative to the melting temperature ($T_m$) of the polyolefin alone. For example, the relative amounts of poly(alkenyl aromatic) resin and poly(arylene ether) may be chosen so that the poly(arylene ether)

and the poly(alkenyl aromatic) resin form a single phase having a glass transition temperature at least about 20° C. greater, preferably at least about 30° C. greater, than the glass transition temperature of the poly(alkenyl aromatic) resin alone, which may be, for example, about 100° C. to about 110° C. Also, the relative amounts of poly(alkenyl aromatic) resin and poly(arylene ether) may be chosen so that the poly(arylene ether) and the poly(alkenyl aromatic) resin form a single phase having a glass transition temperature up to about 15° C. greater, preferably up to about 10° C. greater, more preferably up to about 1° C. greater, than the $T_m$ of the polyolefin alone. The relative amounts of poly(alkenyl aromatic) resin and poly(arylene ether) may be chosen so that the poly (arylene ether) and the poly(alkenyl aromatic) resin form a single phase having a glass transition temperature of about 130° C. to about 180° C.

The PO/PPE blend may, optionally, comprise a hydrogenated block copolymer of an alkenyl aromatic compound and a conjugated diene. The hydrogenated block copolymer is a copolymer comprising (A) at least one block derived from an alkenyl aromatic compound and (B) at least one block derived from a conjugated diene, in which the aliphatic unsaturated group content in the block (B) is reduced by hydrogenation. The arrangement of blocks (A) and (B) includes a linear structure and a so-called radial teleblock structure having branched chains.

Preferred of these structures are linear structures embracing diblock (A-B block), triblock (A-B-A block or B-A-B block), tetrablock (A-B-A-B block), and pentablock (A-B-A-B-A block or B-A-B-A-B block) structures as well as linear structures containing 6 or more blocks in total of A and B. More preferred are diblock, triblock, and tetrablock structures, with the A-B diblock and A-B-A triblock structures being particularly preferred.

The alkenyl aromatic compound providing the block (A) is represented by formula:

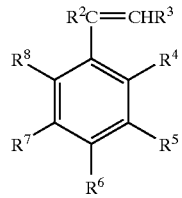

wherein $R^2$ and $R^3$ each independently represent a hydrogen atom, a $C_1$–$C_8$ alkyl group, a $C_2$–$C_8$ alkenyl group, or the like; $R^4$ and $R^8$ each independently represent a hydrogen atom, a $C_1$–$C_8$ alkyl group, a chlorine atom, a bromine atom, or the like; and $R^5$–$R^7$ each independently represent a hydrogen atom, a $C_1$–$C_8$ alkyl group, a $C_2$–$C_8$ alkenyl group, or the like, or $R^4$ and $R^5$ are taken together with the central aromatic ring to form a naphthyl group, or $R^5$ and $R^6$ are taken together with the central aromatic ring to form a naphthyl group.

Specific examples, of the alkenyl aromatic compounds include styrene, p-methylstyrene, alpha-methylstyrene, vinylxylenes, vinyltoluenes, vinylnaphthalenes, divinylbenzenes, bromostyrenes, chlorostyrenes, and the like, and combinations comprising at least one of the foregoing alkenyl aromatic compounds. Of these, styrene, alpha-methylstyrene, p-methylstyrene, vinyltoluenes, and vinylxylenes are preferred, with styrene being more preferred.

Specific examples of the conjugated diene include 1,3-butadiene, 2-methyl-1,3-butadiene, 2,3-dimethyl-1,3-butadiene, 1,3-pentadiene, and the like. Preferred among them are 1,3-butadiene and 2-methyl-1,3-butadiene, with 1,3-butadiene being more preferred.

In addition to the conjugated diene, the hydrogenated block copolymer may contain a small proportion of a lower olefinic hydrocarbon such as, for example, ethylene, propylene, 1-butene, dicyclopentadiene, a non-conjugated diene, or the like.

There is no particular restriction on the content of the repeating unit derived from the alkenyl aromatic compound in the hydrogenated block copolymer. Suitable alkenyl aromatic content may be about 10 to about 90 weight percent based on the total weight of the hydrogenated block copolymer. Within this range, it may be preferred to have an alkenyl aromatic content of at least about 40 weight percent, more preferably at least about 50 weight percent, yet more preferably at least about 55 weight percent. Also within this range, it may be preferred to have an alkenyl aromatic content of up to about 85 weight percent, more preferably up to about 75 weight percent.

There is no particular limitation on the mode of incorporation of the conjugated diene in the hydrogenated block copolymer backbone. For example, when the conjugated diene is 1,3-butadiene, it may be incorporated with about 1% to about 99% 1,2-incorporation with the remainder being 1,4-incorporation.

The hydrogenated block copolymer is preferably hydrogenated to such a degree that fewer than 50%, more preferably fewer than 20%, yet more preferably fewer than 10%, of the unsaturated bonds in the aliphatic chain moiety derived from the conjugated diene remain unreduced. The aromatic unsaturated bonds derived from the alkenyl aromatic compound may be hydrogenated to a degree of up to about 25%.

The hydrogenated block copolymer preferably has a number average molecular weight of about 5,000 to about 500,000 AMU, as determined by gel permeation chromatography (GPC) using polystyrene standards. Within this range, the number average molecular weight may preferably be at least about 10,000 AMU, more preferably at least about 30,000 AMU, yet more preferably at least about 45,000 AMU. Also within this range, the number average molecular weight may preferably be up to about 300,000 AMU, more preferably up to about 200,000 AMU, yet more preferably up to about 150,000 AMU.

The molecular weight distribution of the hydrogenated block copolymer as measured by GPC is not particularly limited. The copolymer may have any ratio of weight average molecular weight to number average molecular weight.

Particularly preferred hydrogenated block copolymers are the styrene-(ethylene-butylene) diblock and styrene-(ethylene-butylene)-styrene triblock copolymers obtained by hydrogenation of styrene-butadiene and styrene-butadiene-styrene triblock copolymers, respectively.

Suitable hydrogenated block copolymers include those commercially available as, for example, KRATON® G1650, G1651, and G1652 available from Kraton Polymers (formerly a division of Shell Chemical Company), and TUFTEC® H1041, H1043, H1052, H1062, H1141, and H1272 available from Asahi Chemical. Preferred hydrogenated block copolymers include the highly hydrogenated styrene-(ethylene-butylene)-styrene triblock copolymers commercially available as, for example, TUFTEC® H1043 from Asahi Chemical.

When it is present in the PO/PPE blend, the hydrogenated block copolymer may be used in an amount of about 1 to about 20 weight percent, preferably about 1 to about 18 weight percent, more preferably about 1 to about 15 weight percent, based on the total weight of the PO/PPE blend.

The PO/PPE blend may, optionally, comprise an unhydrogenated block copolymer of alkenyl aromatic compound and a conjugated diene (referred to hereinafter as an "unhydrogenated block copolymer"). The unhydrogenated block copolymer is a copolymer comprising (A) at least one block derived from an alkenyl aromatic compound and (B) at least one block derived from a conjugated diene, in which the aliphatic unsaturated group content in the block (B) has not been reduced by hydrogenation. The alkenyl aromatic compound (A) and the conjugated diene (B) are defined in detail above in the description of the hydrogenated block copolymer. The arrangement of blocks (A) and (B) includes a linear structure and a so-called radial teleblock structure having a branched chain.

Preferred of these structures are linear structures embracing diblock (A-B block), triblock (A-B-A block or B-A-B block), tetrablock (A-B-A-B block), and pentablock (A-B-A-B-A block or B-A-B-A-B block) structures as well as linear structures containing 6 or more blocks in total of A and B. More preferred are diblock, triblock, and tetrablock structures, with the A-B-A triblock structure being particularly preferred.

The unhydrogenated block copolymer may comprise about 10 to about 90 weight percent of the (A) blocks. Within this range, it may be preferred to use at least about 20 weight percent (A) blocks. Also within this range, it may be preferred to use up to about 80 weight percent (A) blocks.

Particularly preferred unhydrogenated block copolymers included styrene-butadiene-styrene triblock copolymers.

Suitable unhydrogenated block copolymers may be prepared by known methods or obtained commercially as, for example, KRATON® D series polymers, including KRATON® D1101 and D1102, from Kraton Polymers (formerly a division of Shell Chemical). Suitable unhydrogenated block copolymers further include the styrene-butadiene radial teleblock copolymers available as, for example, K-RESIN® KR01, KR03, KR05, and KR10 sold by Chevron Phillips Chemical Company.

When present in the PO/PPE blend, the unhydrogenated block copolymer may be used at about 1 to about 20 weight percent, preferably about 1 to about 15 weight percent, more preferably about 1 to about 10 weight percent, of the total weight of the PO/PPE blend.

The PO/PPE blend may, optionally, comprise a polypropylene-polystyrene graft copolymer. The polypropylene-polystyrene graft copolymer is herein defined as a graft copolymer having a propylene polymer backbone and one or more styrene polymer grafts.

The propylene polymer material that forms the backbone or substrate of the polypropylene-polystyrene graft copolymer is (a) a homopolymer of propylene; (b) a random copolymer of propylene and an olefin selected from the group consisting of ethylene and C4–C10 olefins, provided that, when the olefin is ethylene, the polymerized ethylene content is up to about 10 weight percent, preferably up to about 4 weight percent, and when the olefin is a C4–C10 olefin, the polymerized content of the C4–C10 olefin is up to about 20 weight percent, preferably up to about 16 weight percent; (c) a random terpolymer of propylene and at least two olefins selected from the group consisting of ethylene and C4–C10 alpha-olefins, provided that the polymerized C4–C10 alpha-olefin content is up to about 20 weight percent, preferably up to about 16 weight percent, and, when ethylene is one of the olefins, the polymerized ethylene content is up to about 5 weight percent, preferably up to about 4 weight percent; or (d) a homopolymer or random copolymer of propylene which is impact-modified with an ethylene-propylene monomer rubber in the reactor as well as by physical blending, the ethylene-propylene monomer rubber content of the modified polymer being about 5 to about 30 weight percent, and the ethylene content of the rubber being about 7 to about 70 weight percent, and preferably about 10 to about 40 weight percent. The C4–C10 olefins include the linear and branched C4–C10 alpha-olefins such as, for example, 1-butene, 1-pentene, 3-methyl-1-butene, 4-methyl-1-pentene, 1-hexene, 3,4-dimethyl-1-butene, 1-heptene, 1-octene, 3-methyl-hexene, and the like. Propylene homopolymers and impact-modified propylene homopolymers are preferred propylene polymer materials. Although not preferred, propylene homopolymers and random copolymers impact modified with an ethylene-propylene-diene monomer rubber having a diene content of about 2 to about 8 weight percent also can be used as the propylene polymer material. Suitable dienes include dicyclopentadiene, 1,6-hexadiene, ethylidene norbornene, and the like.

The term "styrene polymer", used in reference to the grafted polymer present on the backbone of propylene polymer material in the polypropylene-polystyrene graft copolymer, denotes (a) homopolymers of styrene or of an alkyl styrene having at least one C1–C4 linear or branched alkyl ring substituent, especially a p-alkyl styrene; (b) copolymers of the (a) monomers with one another in all proportions; and (c) copolymers of at least one (a) monomer with alpha-methyl derivatives thereof, e.g., alpha-methylstyrene, wherein the alpha-methyl derivative constitutes about 1 to about 40% of the weight of the copolymer.

The polypropylene-polystyrene graft copolymer will typically comprise about 10 to about 90 weight percent of the propylene polymer backbone and about 90 to about 10 weight percent of the styrene polymer graft. Within these ranges, the propylene polymer backbone may preferably account for at least about 20 weight percent, of the total graft copolymer; and the propylene polymer backbone may preferably account for up to about 40 weight percent of the total graft copolymer. Also within these ranges, the styrene polymer graft may preferably account for at least about 50 weight percent, more preferably at least about 60 weight percent, of the total graft copolymer.

The preparation of polypropylene-polystyrene graft copolymers is described, for example, in U.S. Pat. No. 4,990,558 to DeNicola, Jr. et al. Suitable polypropylene-polystyrene graft copolymers are also commercially available as, for example, P1045H1 and P1085H1 from Basell.

When present in the PO/PPE blend, the polypropylene-polystyrene graft copolymer may be used in an amount of about 0.5 to about 15 weight percent, preferably about 0.5 to about 10 weight percent, more preferably about 0.5 to about 8 weight percent, based on the total weight of the composition.

The PO/PPE blend may, optionally, comprise a polyolefin-graft-cyclic anhydride copolymer, which comprises a polyolefin backbone and polar grafts formed from one or more cyclic anhydrides. Such materials include graft copolymers of polyolefins and $C_4$–$C_{12}$ cyclic anhydrides, such as, for example, those available from ExxonMobil under the tradename EXXELOR® and from DuPont under the tradename FUSABOND®. Examples of suitable polyolefin-graft-cyclic anhydride copolymers are the polypropylene-graft-maleic anhydride materials supplied by ExxonMobil as EXXELOR® PO1020 and by DuPont as FUSABOND® M613-05. When present in the PO/PPE blend, the polyolefin-graft-cyclic anhydride copolymer may be used in an amount of about 0.1 to about 10 weight percent, based on the total weight of the PO/PPE blend. Within this range, a polyolefin-graft-cyclic anhydride copolymer amount of at least about 0.5 weight percent may be preferred. Also within this range, a polyolefin-graft-cyclic anhydride copolymer amount of up to about 5 weight percent may be preferred.

The PO/PPE blend may, optionally, comprise an ethylene/alpha-olefin elastomeric copolymer. The alpha-olefin component of the copolymer may be at least one $C_3$–$C_{10}$ alpha-olefin. Preferred alpha-olefins include propylene, 1-butene, and 1-octene. The elastomeric copolymer may be a random copolymer having about 25 to about 75 weight percent ethylene and about 75 to about 25 weight percent alpha-olefin. Within these ranges, it may be preferred to use at least about 40 weight percent ethylene; and it may be preferred to use up to about 60 weight percent ethylene. Also within these ranges, it may be preferred to use at least about 40 weight percent alpha-olefin; and it may be preferred to use up to about 60 weight percent alpha-olefin. The ethylene/alpha-olefin elastomeric copolymer may typically have a melt flow index of about 0.1 to about 20 g/10 min at 2.16 kg and 200° C., and a density of about 0.8 to about 0.9 g/ml.

Particularly preferred ethylene/alpha-olefin elastomeric copolymer rubbers include ethylene-propylene rubbers, ethylene-butene rubbers, ethylene-octene rubbers, and mixtures thereof.

The ethylene/alpha-olefin elastomeric copolymer may be prepared according to known methods or obtained commercially as, for example, the neat ethylene-propylene rubber sold as VISTALON® 878 by ExxonMobil Chemical and the ethylene-butylene rubber sold as EXACT® 4033 by ExxonMobil Chemical. Ethylene/alpha-olefin elastomeric copolymers may also be obtained commercially as blends in polyolefins such as, for example, the ethylene-propylene rubber pre-dispersed in polypropylene sold as product numbers Profax 7624 and Profax 8023 from Basell, and the ethylene-butene rubber pre-dispersed in polypropylene sold as Catalloy K021P from Basell.

When present, the ethylene/alpha-olefin elastomeric copolymer may be used in an amount of about 1 to about 20 weight percent, based on the total weight of the PO/PPE blend. Within this range, it may be preferred to use an ethylene/alpha-olefin copolymer amount of at least about 3 weight percent. Also within this range, it may be preferred to use an ethylene/alpha-olefin copolymer amount of up to about 15 weight percent.

In one embodiment, the amount of ethylene/alpha-olefin elastomeric copolymer may be expressed as a fraction of the total of polyolefin and ethylene/alpha-olefin elastomeric copolymer. Thus, when the ethylene/alpha-olefin elastomeric copolymer is present, its amount may be expressed as about 1 to about 60 weight percent, based on the combined weight of polyolefin and ethylene/alpha-olefin elastomeric copolymer. Within this range, it may be preferred to use at least about 10 weight percent of the ethylene/alpha-olefin copolymer. Also within this range, it may be preferred to use up to about 40 weight percent of the ethylene/alpha-olefin copolymer.

The PO/PPE blend may, optionally, comprise one or more reinforcing fillers. Reinforcing fillers may include, for example, inorganic and organic materials, such as fibers, woven fabrics and non-woven fabrics of the E-, NE-, S-, T- and D-type glasses and quartz; carbon fibers, including poly(acrylonitrile) (PAN) fibers, vapor-grown carbon fibers, and especially graphitic vapor-grown carbon fibers having average diameters of about 3 to about 500 nanometers (see, for example, U.S. Pat. Nos. 4,565,684 and 5,024,818 to Tibbetts et al., U.S. Pat. No. 4,572,813 to Arakawa; U.S. Pat. Nos. 4,663,230 and 5,165,909 to Tennent, U.S. Pat. No. 4,816,289 to Komatsu et al., U.S. Pat. No. 4,876,078 to Arakawa et al., U.S. Pat. No. 5,589,152 to Tennent et al., and U.S. Pat. No. 5,591,382 to Nahass et al.); potassium titanate single-crystal fibers, silicon carbide fibers, boron carbide fibers, gypsum fibers, aluminum oxide fibers, asbestos, iron fibers, nickel fibers, copper fibers, wollastonite fibers; and the like. The reinforcing fillers may be in the form of glass roving cloth, glass cloth, chopped glass, hollow glass fibers, glass mat, glass surfacing mat, and non-woven glass fabric, ceramic fiber fabrics, and metallic fiber fabrics. In addition, synthetic organic reinforcing fillers may also be used including organic polymers capable of forming fibers. Illustrative examples of such reinforcing organic fibers are poly(ether ketone), polyimide benzoxazole, poly(phenylene sulfide), polyesters, aromatic polyamides, aromatic polyimides or polyetherimides, acrylic resins, and poly(vinyl alcohol). Fluoropolymers such as polytetrafluoroethylene, may be used. Also included are natural organic fibers known to one skilled in the art, including cotton cloth, hemp cloth, and felt, carbon fiber fabrics, and natural cellulosic fabrics such as Kraft paper, cotton paper, and glass fiber containing paper. Such reinforcing fillers could be in the form of monofilament or multifilament fibers and could be used either alone or in combination with another type of fiber, through, for example, coweaving or core-sheath, side-by-side, orange-type or matrix and fibril constructions or by other methods known to one skilled in the art of fiber manufacture. They may be in the form of, for example, woven fibrous reinforcements, non-woven fibrous reinforcements, or papers.

Preferred reinforcing fillers include glass fibers. Preferred glass fibers may have diameters of about 2 to about 25 micrometers, more preferably about 10 to about 20 micrometers, yet more preferably about 13 to about 18 micrometers. The length of the glass fibers may be about 0.1 to about 20 millimeters, more preferably about 1 to about 10 millimeters, yet more preferably about 2 to about 8 millimeters. Glass fibers comprising a sizing to increase their compatibility with the polyolefin are particularly preferred. Suitable sizings are described, for example, in U.S. Pat. No. 5,998,029 to Adzima et al. Suitable glass fibers are commercially available as, for example, product numbers 147A-14P (14 micrometer diameter) and 147A-17P (17 micrometer diameter) from Owens Corning.

Preferred reinforcing fillers further include talc. There are no particular limitations on the physical characteristics of the talc. Preferred talcs may have an average particle size of about 0.5 to about 25 micrometers. Within this range, it may be preferred to use a talc having an average particle size up to about 10 micrometers, more preferably up to about 5 micrometers. For some uses of the composition, it may be preferred to employ a talc that is F.D.A. compliant (i.e., compliant with U.S. Food and Drug Administration regulations). Suitable talcs include, for example, the F.D.A. compliant talc having an average particle size of about 3.2 micrometers sold as CIMPACT® 610(C) from Luzenac.

When present in the PO/PPE blend, the reinforcing filler may be used in an amount of about 1 to about 50 weight percent, preferably about 5 to about 50 weight percent, based on the total weight of the PO/PPE blend. When the reinforcing filler is an organoclay, it may be preferred to use it in an amount of at least about 5 weight percent, more preferably at least about 10 weight percent. Also when the reinforcing filler is an organoclay, it may be preferred to use it in an amount of up to about 50 weight percent, more preferably up to about 45 weight percent.

Another embodiment is a method for specifying a multi-component composition, comprising: receiving, from a user system, a first limitation on a first physical property and a second limitation on a second physical property; selecting, based on the first limitation, a first continuous surface relating the first physical property to at least two compositional variables; selecting, based on the second limitation, a second continuous surface relating the second physical property to at least two compositional variables; determining a recommended composition by searching a first continuous surface to determine first compositions that satisfy the first limitation; searching a second continuous surface relating the second physical property to at least two compositional variables to determine second compositions that satisfy the second limitation; determining an intersection of the first compositions and the second compositions; and selecting the recommended composition from the intersection of the first compositions and the second compositions; predicting a value of the first physical property and a value of the second physical property for the recommended composition; and presenting, to the user system, the value of the first physical property and the value of the second physical property for the recommended composition.

Another embodiment is a method for specifying a multi-component composition, comprising: presenting, for display at a user system, a graphical illustration of a plurality of physical property combinations satisfied by a multi-component composition, each property combination comprising a first property value and a second property value; receiving, from the user system, a desired property combination comprising a first desired property value and a second desired property value; determining a first desired property limitation based on the first desired property value and a second desired property limitation based on the second desired property value; determining a recommended composition by searching a first continuous surface relating the first property values to at least two compositional variables to determine first compositions that satisfy the first desired property limitation; searching a second continuous surface relating the second property values to at least two compositional variables to determine second compositions that satisfy the second desired property limitation; determining an intersection of the first compositions and the second compositions; and selecting a recommended composition from the intersection of the first compositions and the second compositions; and predicting a first property value and a second property value for the recommended composition; and presenting, to the user system, the first property value and the second property value for the recommended composition.

Another embodiment is a method for specifying a multi-component thermoplastic or thermoset composition, comprising: receiving a first limitation on a first physical property, and a second limitation on a second physical property different from the first physical property; determining a recommended composition by searching a first continuous surface relating the first physical property to at least two compositional variables to determine first compositions that satisfy the first limitation; searching a second continuous surface relating the second physical property to at least two compositional variables to determine second compositions that satisfy the second limitation; and determining an intersection of the first compositions and the second compositions; and selecting a recommended composition from the intersection of the first compositions and the second compositions; predicting a value of the first physical property and a value of the second physical property for the recommended composition; and presenting, to the user system, the value of the first physical property and the value of the second physical property for the recommended composition.

Another embodiment is a method for specifying a thermoplastic blend comprising a polyolefin and a poly(arylene ether), the method being conducted without human intervention and comprising: receiving a first limitation on a first physical property, and a second limitation on a second physical property different from the first physical property; determining a recommended composition by searching a first continuous surface relating the first physical property to at least two compositional variables to determine first compositions that satisfy the first limitation; searching a second continuous surface relating the second physical property to at least two compositional variables to determine second compositions that satisfy the second limitation; and determining an intersection of the first compositions and the second compositions; and selecting a recommended composition from the intersection of the first compositions and the second compositions; predicting a value of the first physical property and a value of the second physical property for the recommended composition; and sending the value of the first physical property and the value of the second physical property for the recommended composition.

Another embodiment is a system for specifying a multi-component composition without human intervention, comprising: a host system for receiving a first limitation on a first physical property and a second limitation on a second physical property; determining a recommended composition by searching a first continuous surface relating the first physical property to at least two compositional variables to determine first compositions that satisfy the first limitation; searching a second continuous surface relating the second physical property to at least two compositional variables to determine second compositions that satisfy the second limitation; determining an intersection of the first compositions and the second compositions; and selecting a recommended composition from the intersection of the first compositions and the second compositions; predicting a value of the first physical property and a value of the second physical property for the recommended composition; and sending the value of the first physical property and the value of the second physical property for the recommended composition; and a network coupled to the host system.

Another embodiment is a system for specifying a multi-component composition without human intervention, comprising: a host means for receiving a first limitation on a first physical property and a second limitation on a second physical property; determining a recommended composition by searching a first continuous surface relating the first physical property to at least two compositional variables to determine first compositions that satisfy the first limitation; searching a second continuous surface relating the second physical property to at least two compositional variables to determine second compositions that satisfy the second limitation; determining an intersection of the first compositions and the second compositions; and selecting a recommended composition from the intersection of the first compositions and the second compositions; predicting a value of the first physical property and a value of the second physical property for the recommended composition; and sending the value of the first physical property and the value of the second physical property for the recommended composition; and a means for storing data relating to the multi-component composition.

Another embodiment is a storage medium encoded with machine-readable computer program code for determining a multi-component composition, the storage medium including instructions for causing a processor to implement a method comprising: receiving a first limitation on a first physical property and a second limitation on a second physical property; determining a recommended composition by searching a first continuous surface relating the first physical property to at least two compositional variables to determine first compositions that satisfy the first limitation; searching a second continuous surface relating the second physical property to at least two compositional variables to determine second compositions that satisfy the second limitation; determining an intersection of the first compositions and the second compositions; and selecting a recommended composition from the intersection of the first compositions and the second compositions; predicting a value of the first physical property and a value of the second physical property for the recommended composition; and sending the value of the first physical property and the value of the second physical property for the recommended composition.

Another embodiment is a computer data signal for determining a multi-component composition, the computer data signal comprising code configured to cause a processor to implement a method comprising: receiving a first limitation on a first physical property and a second limitation on a second physical property; determining a recommended composition by searching a first continuous surface relating the first physical property to at least two compositional variables to determine first compositions that satisfy the first limitation; searching a second continuous surface relating the second physical property to at least two compositional variables to determine second compositions that satisfy the second limitation; determining an intersection of the first compositions and the second compositions; and selecting a recommended composition from the intersection of the first compositions and the second compositions; predicting a value of the first physical property and a value of the second physical property for the recommended composition; and sending the value of the first physical property and the value of the second physical property for the recommended composition.

The invention is further illustrated by the following non-limiting examples.

EXAMPLE 1

This example describes the design and analysis of an experiment to create continuous mathematical models relating physical property values to compositional variable. The compositional variables corresponded to the amounts of seven components (unless otherwise specified, all amounts are weight percents based on the total weight of the composition):

A: 30–50 weight percent of a 60:40 weight/weight mixture of (a) poly(2,6-dimethyl-1,4-phenylene ether) having an intrinsic viscosity of 0.40 dL/g (measured in chloroform at 25° C.), obtained as .40IV PPO from General Electric Company, and (b) a poly(alkenyl aromatic) resin, which was (b1) homopolystyrene, obtained as Chevron EB3300 (pellet form) from Huntsman Chemical, (b2) rubber-modified polystyrene having a polystyrene molecular weight of 230,000 g/mol and 10.3 weight % polybutadiene, obtained as GEH 1897 (pellet form) from General Electric Company, or (b3) a mixture of homopolystyrene and rubber-modified polystyrene (see variable G);

B: 5–15 weight percent of unhydrogenated styrene-butadiene-styrene triblock copolymer having about 31% polystyrene, obtained as KRATON® D1101 (pellet form) from Shell Chemical Company;

C: 0–10 weight percent of hydrogenated styrene-butadiene-styrene triblock copolymer (also known as styrene-(ethylene-butadiene)-styrene triblock copolymer), 66 weight % polystyrene, obtained as TUFTEC® H1043 (pellet form) from Asahi Chemical;

D: 0–10 weight percent of polypropylene-polystyrene graft copolymer, obtained as Interloy P1045H1 (pellet form) from Montell Polyolefin Inc.;

E: 20–40 weight percent of isotactic propylene polymer obtained as PD403 (pellet form) from Montell Polyolefin Inc.;

F: 5–20 weight percent of ethylene-butylene copolymer, obtained as EXACT® 4033 (pellet form) from ExxonMobil Chemical; and G: 0–100 weight percent, based on the total weight of poly(alkenyl aromatic) resin in component A, of rubber-modified polystyrene in component A.

The experimental design was a mixture design consisting of 69 samples. Values of compositional variables are given in Table 1.

TABLE 1

| Sample No. | A (wt %) | B (wt %) | C (wt %) | D (wt %) | E (wt %) | F (wt %) | G (wt %) |
|---|---|---|---|---|---|---|---|
| 1 | 38.33 | 15.00 | 0.00 | 6.67 | 20.00 | 20.00 | 0.00 |
| 2 | 38.33 | 15.00 | 0.00 | 6.67 | 20.00 | 20.00 | 0.00 |
| 3 | 50.00 | 15.00 | 0.00 | 10.00 | 20.00 | 5.00 | 0.00 |
| 4 | 35.00 | 15.00 | 0.00 | 10.00 | 20.00 | 20.00 | 100.00 |
| 5 | 35.00 | 15.00 | 10.00 | 10.00 | 25.00 | 5.00 | 0.00 |
| 6 | 50.00 | 10.00 | 0.00 | 0.00 | 20.00 | 20.00 | 0.00 |
| 7 | 50.00 | 5.00 | 6.67 | 3.33 | 30.00 | 5.00 | 0.00 |
| 8 | 50.00 | 10.00 | 0.00 | 0.00 | 20.00 | 20.00 | 100.00 |
| 9 | 50.00 | 5.00 | 0.00 | 0.00 | 40.00 | 5.00 | 0.00 |
| 10 | 30.00 | 5.00 | 10.00 | 6.67 | 35.00 | 13.33 | 0.00 |
| 11 | 42.00 | 10.33 | 5.33 | 5.33 | 32.00 | 5.00 | 100.00 |
| 12 | 30.00 | 5.00 | 10.00 | 10.00 | 40.00 | 5.00 | 100.00 |
| 13 | 35.00 | 15.00 | 10.00 | 10.00 | 25.00 | 5.00 | 100.00 |
| 14 | 45.00 | 15.00 | 6.67 | 0.00 | 20.00 | 13.33 | 100.00 |
| 15 | 50.00 | 15.00 | 10.00 | 0.00 | 20.00 | 5.00 | 100.00 |
| 16 | 37.50 | 5.00 | 0.00 | 10.00 | 27.50 | 20.00 | 0.00 |
| 17 | 30.00 | 15.00 | 10.00 | 5.00 | 20.00 | 20.00 | 100.00 |
| 18 | 30.00 | 15.00 | 0.00 | 0.00 | 35.00 | 20.00 | 100.00 |
| 19 | 45.00 | 5.00 | 10.00 | 0.00 | 20.00 | 20.00 | 0.00 |
| 20 | 43.33 | 15.00 | 0.00 | 0.00 | 36.67 | 5.00 | 0.00 |

TABLE 1-continued

| Sample No. | A (wt %) | B (wt %) | C (wt %) | D (wt %) | E (wt %) | F (wt %) | G (wt %) |
|---|---|---|---|---|---|---|---|
| 21 | 50.00 | 15.00 | 10.00 | 0.00 | 20.00 | 5.00 | 0.00 |
| 22 | 50.00 | 5.00 | 10.00 | 10.00 | 20.00 | 5.00 | 100.00 |
| 23 | 40.00 | 5.00 | 10.00 | 10.00 | 20.00 | 15.00 | 25.00 |
| 24 | 35.00 | 5.00 | 10.00 | 0.00 | 30.00 | 20.00 | 100.00 |
| 25 | 40.00 | 15.00 | 10.00 | 10.00 | 20.00 | 5.00 | 50.00 |
| 26 | 40.00 | 8.33 | 10.00 | 0.00 | 36.67 | 5.00 | 0.00 |
| 27 | 50.00 | 15.00 | 10.00 | 0.00 | 20.00 | 5.00 | 0.00 |
| 28 | 42.50 | 5.00 | 0.00 | 0.00 | 32.50 | 20.00 | 50.00 |
| 29 | 35.00 | 5.00 | 10.00 | 10.00 | 20.00 | 20.00 | 100.00 |
| 30 | 30.00 | 10.00 | 10.00 | 10.00 | 20.00 | 20.00 | 0.00 |
| 31 | 50.00 | 15.00 | 0.00 | 10.00 | 20.00 | 5.00 | 100.00 |
| 32 | 30.00 | 5.00 | 0.00 | 5.00 | 40.00 | 20.00 | 100.00 |
| 33 | 50.00 | 5.00 | 0.00 | 0.00 | 40.00 | 5.00 | 100.00 |
| 34 | 30.00 | 15.00 | 10.00 | 0.00 | 40.00 | 5.00 | 100.00 |
| 35 | 50.00 | 5.00 | 0.00 | 0.00 | 40.00 | 5.00 | 0.00 |
| 36 | 30.00 | 15.00 | 0.00 | 10.00 | 40.00 | 5.00 | 0.00 |
| 37 | 33.33 | 15.00 | 0.00 | 0.00 | 38.33 | 13.33 | 25.00 |
| 38 | 30.00 | 15.00 | 0.00 | 10.00 | 25.00 | 20.00 | 0.00 |
| 39 | 50.00 | 5.00 | 10.00 | 10.00 | 20.00 | 5.00 | 100.00 |
| 40 | 42.00 | 10.33 | 5.33 | 5.33 | 32.00 | 5.00 | 100.00 |
| 41 | 30.00 | 15.00 | 10.00 | 0.00 | 40.00 | 5.00 | 50.00 |
| 42 | 30.00 | 5.00 | 10.00 | 10.00 | 40.00 | 5.00 | 0.00 |
| 43 | 30.00 | 5.00 | 5.00 | 0.00 | 40.00 | 20.00 | 0.00 |
| 44 | 30.00 | 5.00 | 5.00 | 10.00 | 30.00 | 20.00 | 100.00 |
| 45 | 50.00 | 5.00 | 0.00 | 3.33 | 31.67 | 10.00 | 100.00 |
| 46 | 50.00 | 15.00 | 0.00 | 10.00 | 20.00 | 5.00 | 100.00 |
| 47 | 41.67 | 5.00 | 0.00 | 10.00 | 25.00 | 18.33 | 75.00 |
| 48 | 30.00 | 15.00 | 10.00 | 0.00 | 40.00 | 5.00 | 0.00 |
| 49 | 31.67 | 15.00 | 10.00 | 0.00 | 23.33 | 20.00 | 0.00 |
| 50 | 30.00 | 11.67 | 0.00 | 10.00 | 35.00 | 13.33 | 100.00 |
| 51 | 50.00 | 5.00 | 10.00 | 10.00 | 20.00 | 5.00 | 0.00 |
| 52 | 36.67 | 5.00 | 10.00 | 0.00 | 40.00 | 8.33 | 75.00 |
| 53 | 30.00 | 15.00 | 0.00 | 10.00 | 40.00 | 5.00 | 100.00 |
| 54 | 50.00 | 15.00 | 10.00 | 0.00 | 20.00 | 5.00 | 100.00 |
| 55 | 31.67 | 15.00 | 10.00 | 0.00 | 23.33 | 20.00 | 0.00 |
| 56 | 45.00 | 5.00 | 0.00 | 10.00 | 35.00 | 5.00 | 100.00 |
| 57 | 45.00 | 11.67 | 3.33 | 10.00 | 20.00 | 10.00 | 0.00 |
| 58 | 50.00 | 0.00 | 10.00 | 5.00 | 35.00 | 0.00 | 100.00 |
| 59 | 50.00 | 0.00 | 10.00 | 0.00 | 30.00 | 10.00 | 0.00 |
| 60 | 30.00 | 0.00 | 5.00 | 0.00 | 50.00 | 15.00 | 100.00 |
| 61 | 35.00 | 0.00 | 5.00 | 10.00 | 50.00 | 0.00 | 0.00 |
| 62 | 35.00 | 15.00 | 0.00 | 0.00 | 50.00 | 0.00 | 100.00 |
| 63 | 40.00 | 0.00 | 0.00 | 10.00 | 50.00 | 0.00 | 100.00 |
| 64 | 50.00 | 15.00 | 0.00 | 5.00 | 30.00 | 0.00 | 0.00 |
| 65 | 30.00 | 7.50 | 0.00 | 0.00 | 50.00 | 12.50 | 0.00 |
| 66 | 50.00 | 0.00 | 0.00 | 0.00 | 50.00 | 0.00 | 50.00 |
| 67 | 50.00 | 0.00 | 10.00 | 0.00 | 40.00 | 0.00 | 25.00 |
| 68 | 50.00 | 15.00 | 10.00 | 2.50 | 22.50 | 0.00 | 75.00 |
| 69 | 30.00 | 0.00 | 10.00 | 10.00 | 50.00 | 0.00 | 25.00 |

Property measurements were performed on each sample according to ASTM methods. Flexural modulus was measured at 23° C. according to ASTM D790. Heat distortion temperatures (HDT) at 64 and 264 psi were measured according to ASTM D648. Izod notched and unnotched impact strengths were measured at 23° C. according to ASTM D256. DYNATUP® (falling dart) total energy, energy to maximum load, and energy to failure were measured according to ASTM D3763. Tensile elongation at break, tensile strength at break, and tensile strength at yield were measured according to ASTM D638. Property values are given in Table 2.

TABLE 2

| | Sample No. | | | | | | | |
|---|---|---|---|---|---|---|---|---|
| | 1 | 2 | 3 | 4 | 5 | 6 | 7 | 8 |
| HDT, 66 psi, ⅛", 3 samples (deg F.) | 244.50 | 245.90 | 265.10 | 226.10 | 233.60 | 267.40 | 263.00 | 256.00 |
| HDT, 264 psi, ⅛", 3 samples (deg F.) | 163.30 | 164.10 | 201.00 | 137.70 | 166.00 | 200.80 | 195.80 | 183.30 |
| Notched Izod, 73F, 5 bars (ft-lb/in) | 2.10 | 2.30 | 1.70 | 2.20 | 11.60 | 1.70 | 5.60 | 1.30 |
| Notched Izod, −20F, 5 bars (ft-lb/in) | 1.20 | 1.30 | 1.00 | 1.50 | 5.90 | 1.00 | 1.10 | 1.00 |
| Energy to Failure, 73F, 7.5 mph, 5 bars (ft-lb) | 2.45 | 2.57 | 0.82 | 9.87 | 18.06 | 0.84 | 20.45 | 1.27 |
| std. dev. | 0.29 | 0.13 | 0.24 | 0.96 | 0.57 | 0.28 | 0.30 | 1.02 |
| Total Energy, 73F, 7.5 mph, 5 discs (ft-lb) | 2.71 | 2.85 | 1.03 | 10.27 | 28.59 | 1.23 | 31.25 | 2.18 |
| std. dev. | 0.31 | 0.11 | 40.00 | 0.98 | 0.88 | 0.45 | 1.07 | 0.72 |

TABLE 2-continued

| | | | | | | | | |
|---|---|---|---|---|---|---|---|---|
| Energy to Failure, −20F, 7.5 mph, 5 discs (ft-lb) | 0.83 | 0.83 | 0.45 | 2.59 | 22.34 | 0.27 | 3.06 | 0.29 |
| std. dev. | 0.07 | 0.06 | 0.08 | 1.07 | 0.55 | 0.21 | 1.63 | 0.02 |
| Total Energy, −20F, 7.5 mph, 5 discs (ft-lb) | 0.90 | 0.91 | 51.00 | 2.74 | 33.11 | 0.31 | 3.27 | 0.33 |
| std. dev. | 0.07 | 0.07 | 0.08 | 1.11 | 1.73 | 0.21 | 1.71 | 0.03 |
| Energy to Failure, −20F, 5 mph, 5 discs (ft-lb) | 0.85 | 0.82 | 0.37 | 2.22 | 22.54 | 0.40 | 6.47 | 0.41 |
| std. dev. | 0.13 | 0.11 | 0.03 | 0.75 | 0.46 | 0.24 | 3.41 | 0.28 |
| Total Energy, −20F, 5 mph, 5 discs (ft-lb) | 0.91 | 0.89 | 0.41 | 2.33 | 33.94 | 0.45 | 6.70 | 0.45 |
| std. dev. | 0.12 | 0.09 | 0.02 | 0.77 | 0.88 | 0.28 | 3.48 | 0.31 |
| Flexural Modulus, 73F, 1/8", 3 bars (kpsi) | 163,500 | 164,400 | 250,600 | 123,600 | 195,900 | 187,500 | 247,700 | 156,600 |
| Flexural Strength at yield, 73F, 3 bars, 1/8" (psi) | 5,699 | 5,708 | 8,644 | 4,453 | 6,792 | 6,860 | 9,012 | 5,658 |
| Tensile Strength at yield, 73F, 2 in/min, 5 bars (psi) | 3,882 | 3,866 | 5,697 | 3,169 | 4,775 | 4,738 | 6,178 | 3,948 |
| Tensile Strength at break, 73F, 2 in/min, 5 bars (psi) | 3,675 | 3,685 | 5,564 | 3,116 | 5,119 | 4,647 | 5,382 | 3,906 |
| Tensile Elongation at break, 73F, 2 in/min, 5 bars (%) | 33.86 | 33.34 | 11.66 | 57.37 | 265.04 | 14.46 | 120.26 | 14.72 |

| | Sample No. | | | | | | | |
|---|---|---|---|---|---|---|---|---|
| | 9 | 10 | 11 | 12 | 13 | 14 | 15 | 16 |
| HDT, 66 psi, 1/8", 3 samples (deg F.) | 275.70 | 224.90 | 237.20 | 229.60 | 221.70 | 234.50 | 245.40 | 256.00 |
| HDT, 264 psi, 1/8", 3 samples (deg F.) | 207.60 | 153.10 | 159.30 | 152.40 | 153.10 | 154.10 | 174.10 | 183.60 |
| Notched Izod, 73F, 5 bars (ft-lb/in) | 0.70 | 12.90 | 7.70 | 11.30 | 11.90 | 11.10 | 11.70 | 1.60 |
| Notched Izod, −20F, 5 bars (ft-lb/in) | 0.40 | 2.30 | 2.60 | 1.70 | 7.40 | 9.80 | 8.30 | 0.80 |
| Energy to Failure, 73F, 7.5 mph, 5 bars (ft-lb) | 0.29 | 17.21 | 18.05 | 18.15 | 17.16 | 16.98 | 17.88 | 2.24 |
| std. dev. | 0.02 | 0.91 | 0.39 | 0.38 | 0.07 | 0.40 | 0.19 | 0.66 |
| Total Energy, 73F, 7.5 mph, 5 discs (ft-lb) | 0.33 | 30.14 | 27.39 | 31.17 | 28.49 | 24.06 | 26.72 | 2.45 |
| std. dev. | 3.00 | 0.91 | 1.85 | 0.77 | 0.46 | 0.62 | 1.16 | 0.71 |
| Energy to Failure, −20F, 7.5 mph, 5 discs (ft-lb) | 0.28 | 22.05 | 15.02 | 20.89 | 22.30 | 20.66 | 22.25 | 0.81 |
| std. dev. | 0.03 | 0.47 | 6.90 | 6.76 | 0.15 | 0.22 | 0.22 | 0.05 |
| Total Energy, −20F, 7.5 mph, 5 discs (ft-lb) | 0.32 | 34.60 | 16.63 | 29.17 | 31.52 | 29.85 | 32.04 | 0.88 |
| std. dev. | 0.03 | 2.93 | 8.49 | 11.00 | 2.30 | 0.74 | 1.42 | 0.05 |
| Energy to Failure, −20F, 5 mph, 5 discs (ft-lb) | 0.21 | 22.78 | 17.92 | 23.77 | 20.52 | 18.25 | 22.83 | 0.69 |
| std. dev. | 0.05 | 0.39 | 6.53 | 0.36 | 0.77 | 6.45 | 0.70 | 0.04 |
| Total Energy, −20F, 5 mph, 5 discs (ft-lb) | 0.24 | 37.82 | 21.15 | 35.19 | 29.01 | 24.38 | 31.35 | 0.74 |
| std. dev. | 0.05 | 2.28 | 9.38 | 0.42 | 24.26 | 8.64 | 2.81 | 0.06 |
| Flexural Modulus, 73F, 1/8", 3 bars (kpsi) | 264,900 | 177,100 | 195,200 | 190,500 | 188,400 | 142,000 | 180,100 | 192,600 |
| Flexural Strength at yield, 73F, 3 bars, 1/8" (psi) | 9,374 | 6,300 | 6,747 | 6,750 | 6,721 | 5,200 | 6,580 | 6,952 |
| Tensile Strength at yield, 73F, 2 in/min, 5 bars (psi) | 6,322 | 4,585 | 4,663 | 4,908 | 4,298 | 3,945 | 4,564 | 4,799 |
| Tensile Strength at break, 73F, 2 in/min, 5 bars (psi) | 6,258 | 4,962 | 4,812 | 4,750 | 5,057 | 4,602 | 5,112 | 4,511 |
| Tensile Elongation at break, 73F, 2 in/min, 5 bars (%) | 10.98 | 367.70 | 231.30 | 311.40 | 338.00 | 213.44 | 202.06 | 26.64 |

| | Sample No. | | | | | | | |
|---|---|---|---|---|---|---|---|---|
| | 17 | 18 | 19 | 20 | 21 | 22 | 23 | 24 |
| HDT, 66 psi, 1/8", 3 samples (deg F.) | 195.40 | 219.20 | 249.00 | 262.90 | 254.30 | 252.70 | 245.30 | 215.40 |
| HDT, 264 psi, 1/8", 3 samples (deg F.) | 149.20 | 140.10 | 184.90 | 192.90 | 195.80 | 182.40 | 174.30 | 139.70 |
| Notched Izod, 73F, 5 bars (ft-lb/in) | 12.70 | 1.50 | 12.50 | 1.00 | 0.20 | 8.90 | 11.90 | 12.40 |
| Notched Izod, −20F, 5 bars (ft-lb/in) | 14.20 | 0.80 | 8.10 | 0.50 | 4.60 | 2.50 | 4.70 | 12.30 |
| Energy to Failure, 73F, 7.5 mph, 5 bars (ft-lb) | 14.98 | 4.32 | 18.39 | 0.45 | 19.34 | 18.77 | 16.90 | 16.01 |
| std. dev. | 0.80 | 1.05 | 1.05 | 0.25 | 0.75 | 0.42 | 0.52 | 0.43 |
| Total Energy, 73F, 7.5 mph, 5 discs (ft-lb) | 24.14 | 4.56 | 27.00 | 0.55 | 27.63 | 24.64 | 26.58 | 26.25 |
| std. dev. | 1.05 | 1.07 | 1.49 | 0.29 | 2.93 | 2.29 | 0.59 | 0.63 |
| Energy to Failure, −20F, 7.5 mph, 5 discs (ft-lb) | 18.73 | 0.88 | 22.14 | 0.25 | 23.74 | 11.42 | 22.46 | 20.01 |
| std. dev. | 0.28 | 0.08 | 0.26 | 0.01 | 0.22 | 3.99 | 0.43 | 0.23 |
| Total Energy, −20F, 7.5 mph, 5 discs (ft-lb) | 31.99 | 0.96 | 31.76 | 0.30 | 32.29 | 12.31 | 33.52 | 31.47 |
| std. dev. | 0.67 | 0.08 | 0.84 | 0.01 | 1.45 | 3.83 | 2.25 | 1.75 |
| Energy to Failure, −20F, 5 mph, 5 discs (ft-lb) | 18.67 | 1.12 | 22.44 | 0.19 | 23.73 | 20.31 | 21.40 | 20.01 |
| std. dev. | 0.41 | 0.39 | 0.37 | 0.03 | 0.49 | 2.88 | 3.46 | 0.30 |
| Total Energy, −20F, 5 mph, 5 discs (ft-lb) | 30.94 | 1.27 | 32.42 | 0.22 | 33.03 | 23.02 | 32.06 | 32.75 |
| std. dev. | 1.76 | 0.42 | 1.20 | 0.02 | 2.29 | 4.58 | 4.68 | 0.88 |
| Flexural Modulus, 73F, 1/8", 3 bars (kpsi) | 109,800 | 125,300 | 172,700 | 222,600 | 211,800 | 211,200 | 178,100 | 117,800 |
| Flexural Strength at yield, 73F, 3 bars, 1/8" (psi) | 4,013 | 4,578 | 6,501 | 7,757 | 7,787 | 7,748 | 6,546 | 4,494 |
| Tensile Strength at yield, 73F, 2 in/min, 5 bars (psi) | 3,162 | 3,356 | 4,746 | 5,205 | 5,445 | 5,488 | 4,817 | 3,700 |
| Tensile Strength at break, 73F, 2 in/min, 5 bars (psi) | 4,499 | 3,069 | 4,896 | 5,066 | 5,408 | 5,257 | 4,834 | 4,771 |
| Tensile Elongation at break, 73F, 2 in/min, 5 bars (%) | 400.00 | 57.68 | 156.48 | 13.81 | 175.11 | 146.69 | 185.80 | 329.91 |

TABLE 2-continued

| | Sample No. | | | | | | | |
|---|---|---|---|---|---|---|---|---|
| | 25 | 26 | 27 | 28 | 29 | 30 | 31 | 32 |
| HDT, 66 psi, 1/8", 3 samples (deg F.) | 237.40 | 241.60 | 254.50 | 261.70 | 222.20 | 221.00 | 259.70 | 238.60 |
| HDT, 264 psi, 1/8", 3 samples (deg F.) | 171.70 | 173.40 | 195.60 | 175.70 | 146.50 | 150.80 | 185.20 | 138.30 |
| Notched Izod, 73F, 5 bars (ft-lb/in) | 10.70 | 10.30 | 9.90 | 1.30 | 12.60 | 13.40 | 0.90 | 1.20 |
| Notched Izod, −20F, 5 bars (ft-lb/in) | 6.60 | 1.30 | 5.50 | 0.80 | 12.50 | 12.90 | 0.60 | 0.70 |
| Energy to Failure, 73F, 7.5 mph, 5 bars (ft-lb) | 17.40 | 17.89 | 18.55 | 1.16 | 15.96 | 16.11 | 0.51 | 5.35 |
| std. dev. | 0.32 | 0.54 | 0.42 | 0.23 | 1.94 | 0.30 | 0.13 | 1.63 |
| Total Energy, 73F, 7.5 mph, 5 discs (ft-lb) | 26.78 | 26.90 | 27.11 | 1.49 | 24.61 | 26.75 | 0.63 | 5.64 |
| std. dev. | 0.73 | 2.41 | 1.92 | 0.50 | 2.61 | 0.36 | 0.20 | 1.68 |
| Energy to Failure, −20F, 7.5 mph, 5 discs (ft-lb) | 22.27 | 19.78 | 23.37 | 0.48 | 20.43 | 20.13 | 0.41 | 0.82 |
| std. dev. | 0.25 | 5.99 | 0.20 | 0.10 | 0.25 | 0.19 | 0.06 | 0.07 |
| Total Energy, −20F, 7.5 mph, 5 discs (ft-lb) | 30.38 | 24.81 | 33.34 | 0.54 | 31.01 | 32.56 | 0.46 | 0.89 |
| std. dev. | 1.63 | 10.08 | 0.92 | 0.11 | 2.26 | 1.32 | 0.06 | 0.07 |
| Energy to Failure, −20F, 5 mph, 5 discs (ft-lb) | 21.59 | 22.46 | 23.23 | 0.61 | 19.74 | 20.09 | 0.36 | 0.77 |
| std. dev. | 1.42 | 1.72 | 0.34 | 0.13 | 0.40 | 0.28 | 0.06 | 0.13 |
| Total Energy, −20F, 5 mph, 5 discs (ft-lb) | 28.89 | 30.27 | 32.88 | 0.65 | 30.94 | 33.07 | 0.41 | 0.82 |
| std. dev. | 3.67 | 5.67 | 1.17 | 0.14 | 3.06 | 2.10 | 0.05 | 0.14 |
| Flexural Modulus, 73F, 1/8", 3 bars (kpsi) | 185,400 | 197,100 | 211,100 | 163,700 | 136,100 | 142,100 | 198,900 | 147,800 |
| Flexural Strength at yield, 73F, 3 bars, 1/8" (psi) | 6,576 | 7,246 | 7,801 | 6,208 | 4,962 | 5,148 | 6,923 | 5,434 |
| Tensile Strength at yield, 73F, 2 in/min, 5 bars (psi) | 4,718 | 5,198 | 5,415 | 4,448 | 3,918 | 3,854 | 4,679 | 3,900 |
| Tensile Strength at break, 73F, 2 in/min, 5 bars (psi) | 5,259 | 5,095 | 5,394 | 4,239 | 5,043 | 4,906 | 4,617 | 3,307 |
| Tensile Elongation at break, 73F, 2 in/min, 5 bars (%) | 251.42 | 233.78 | 176.30 | 22.20 | 325.98 | 347.19 | 10.95 | 51.77 |

| | Sample No. | | | | | | | |
|---|---|---|---|---|---|---|---|---|
| | 33 | 34 | 35 | 36 | 37 | 38 | 39 | 40 |
| HDT, 66 psi, 1/8", 3 samples (deg F.) | 270.00 | 201.80 | 274.90 | 243.30 | 244.80 | 228.70 | 248.60 | 240.00 |
| HDT, 264 psi, 1/8", 3 samples (deg F.) | 194.60 | 137.80 | 211.50 | 162.90 | 159.00 | 146.30 | 181.30 | 159.00 |
| Notched Izod, 73F, 5 bars (ft-lb/in) | 0.50 | 12.20 | 0.70 | 1.10 | 1.10 | 3.20 | 9.50 | 6.90 |
| Notched Izod, −20F, 5 bars (ft-lb/in) | 0.40 | 6.00 | 0.40 | 0.70 | 0.60 | 1.60 | 3.00 | 2.70 |
| Energy to Failure, 73F, 7.5 mph, 5 bars (ft-lb) | 0.62 | 16.55 | 0.40 | 1.54 | 0.98 | 12.11 | 19.58 | 17.26 |
| std. dev. | 0.68 | 0.19 | 0.10 | 0.58 | 0.18 | 1.21 | 0.32 | 0.39 |
| Total Energy, 73F, 7.5 mph, 5 discs (ft-lb) | 0.65 | 28.78 | 0.46 | 1.66 | 1.10 | 12.77 | 27.39 | 25.40 |
| std. dev. | 0.67 | 1.40 | 0.10 | 0.61 | 0.20 | 0.27 | 0.67 | 2.05 |
| Energy to Failure, −20F, 7.5 mph, 5 discs (ft-lb) | 0.20 | 21.31 | 0.25 | 0.72 | 0.40 | 5.27 | 22.13 | 16.70 |
| std. dev. | 0.03 | 0.19 | 0.02 | 0.11 | 0.08 | 2.08 | 3.15 | 6.27 |
| Total Energy, −20F, 7.5 mph, 5 discs (ft-lb) | 0.23 | 32.97 | 0.29 | 0.79 | 0.45 | 5.53 | 26.43 | 19.16 |
| srd. dev. | 0.03 | 1.65 | 0.02 | 0.11 | 0.08 | 2.14 | 4.64 | 6.89 |
| Energy to Failure, −20F, 5 mph, 5 discs (ft-lb) | 0.23 | 21.35 | 0.18 | 0.60 | 0.41 | 6.58 | 22.41 | 20.79 |
| std. dev. | 0.19 | 0.51 | 0.04 | 0.07 | 0.03 | 1.42 | 2.78 | 3.54 |
| Total Energy, −20F, 5 mph, 5 discs (ft-lb) | 0.28 | 33.96 | 0.21 | 0.66 | 0.46 | 6.77 | 27.45 | 24.23 |
| std. dev. | 0.25 | 2.60 | 0.05 | 0.07 | 0.04 | 1.44 | 5.21 | 5.96 |
| Flexural Modulus, 73F, 1/8", 3 bars (kpsi) | 222,500 | 151,200 | 251,200 | 203,400 | 166,700 | 146,100 | 212,900 | 193,400 |
| Flexural Strength at yield, 73F, 3 bars, 1/8" (psi) | 7,573 | 5,239 | 9,115 | 6,985 | 5,782 | 5,063 | 7,699 | 6,670 |
| Tensile Strength at yield, 73F, 2 in/min, 5 bars (psi) | 5,107 | 3,950 | 6,182 | 4,680 | 4,012 | 3,547 | 5,405 | 4,700 |
| Tensile Strength at break, 73F, 2 in/min, 5 bars (psi) | 5,102 | 4,202 | 6,142 | 4,348 | 3,808 | 3,305 | 5,325 | 4,738 |
| Tensile Elongation at break, 73F, 2 in/min, 5 bars (%) | 9.30 | 379.80 | 10.81 | 25.84 | 27.13 | 81.30 | 169.04 | 220.40 |

| | Sample No. | | | | | | | |
|---|---|---|---|---|---|---|---|---|
| | 41 | 42 | 43 | 44 | 45 | 46 | 47 | 48 |
| HDT, 66 psi, 1/8", 3 samples (deg F.) | 214.60 | 237.60 | 215.00 | 209.00 | 267.10 | 260.80 | 258.00 | 219.80 |
| HDT, 264 psi, 1/8", 3 samples (deg F.) | 147.00 | 163.80 | 140.20 | 138.20 | 195.20 | 189.50 | 176.40 | 151.70 |
| Notched Izod, 73F, 5 bars (ft-lb/in) | 12.40 | 10.60 | 12.00 | 11.30 | 0.70 | 0.50 | 1.40 | 12.60 |
| Notched Izod, −20F, 5 bars (ft-lb/in) | 2.60 | 0.90 | 2.90 | 5.70 | 0.60 | 0.40 | 0.80 | 2.30 |
| Energy to Failure, 73F, 7.5 mph, 5 bars (ft-lb) | 14.57 | 16.41 | 14.79 | 15.05 | 0.31 | 0.63 | 2.24 | 16.20 |
| std. dev. | 0.25 | 0.49 | 0.21 | 0.15 | 0.03 | 0.27 | 0.30 | 0.26 |
| Total Energy, 73F, 7.5 mph, 5 discs (ft-lb) | 25.72 | 28.15 | 25.03 | 24.94 | 0.35 | 0.78 | 2.44 | 30.11 |
| std. dev. | 0.74 | 0.97 | 0.71 | 0.60 | 0.03 | 0.37 | 0.31 | 0.58 |
| Energy to Failure, −20F, 7.5 mph, 5 discs (ft-lb) | 20.87 | 12.30 | 20.59 | 19.76 | 0.36 | 0.12 | 0.63 | 21.82 |
| std. dev. | 0.11 | 9.59 | 0.72 | 0.14 | 0.25 | 0.50 | 0.05 | 0.29 |
| Total Energy, −20F, 7.5 mph, 5 discs (ft-lb) | 29.59 | 13.60 | 29.22 | 32.40 | 0.41 | 0.16 | 0.70 | 34.00 |
| std. dev. | 1.79 | 10.99 | 4.66 | 1.03 | 0.26 | 0.51 | 0.05 | 2.41 |
| Energy to Failure, −20F, 5 mph, 5 discs (ft-lb) | 20.13 | 10.93 | 18.30 | 19.70 | 0.25 | 0.32 | 0.50 | 21.86 |
| std. dev. | 1.71 | 3.71 | 3.65 | 0.47 | 0.04 | 0.19 | 0.05 | 0.45 |
| Total Energy, −20F, 5 mph, 5 discs (ft-lb) | 27.41 | 12.19 | 26.67 | 30.31 | 0.28 | 0.37 | 0.54 | 34.59 |

TABLE 2-continued

| | | | | | | | | |
|---|---|---|---|---|---|---|---|---|
| std. dev. | 5.66 | 5.16 | 8.22 | 3.39 | 0.04 | 0.25 | 0.05 | 2.24 |
| Flexural Modulus, 73F, ⅛", 3 bars (kpsi) | 165,200 | 216,500 | 150,900 | 146,600 | 214,600 | 208,600 | 178,900 | — |
| Flexural Strength at yield, 73F, 3 bars, ⅛" (psi) | 5,873 | 7,695 | 5,235 | 5,116 | 7,526 | 7,053 | 6,353 | — |
| Tensile Strength at yield, 73F, 2 in/min, 5 bars (psi) | 4,069 | 5,232 | 4,004 | 3,836 | 5,019 | 4,607 | 4,342 | 4,306 |
| Tensile Strength at break, 73F, 2 in/min, 5 bars (psi) | 4,287 | 4,559 | — | — | 4,992 | 4,540 | 4,190 | 4,464 |
| Tensile Elongation at break, 73F, 2 in/min, 5 bars (%) | 375.00 | 219.88 | 400.00 | 400.00 | 11.41 | 10.14 | 23.87 | 357.50 |

| | Sample No. | | | | | | | |
|---|---|---|---|---|---|---|---|---|
| | 49 | 50 | 51 | 52 | 53 | 54 | 55 | 56 |
| HDT, 66 psi, ⅛", 3 samples (deg F.) | 215.80 | 230.10 | — | 221.50 | 231.30 | 244.40 | 211.70 | 266.20 |
| HDT, 264 psi, ⅛", 3 samples (deg F.) | 146.30 | 144.90 | 199.60 | 153.20 | 149.90 | 179.00 | 142.50 | 189.80 |
| Notched Izod, 73F, 5 bars (ft-lb/in) | 13.20 | — | 7.70 | 11.90 | 1.50 | 11.70 | 13.30 | 0.80 |
| Notched Izod, −20F, 5 bars (ft-lb/in) | 13.80 | — | 0.90 | 1.70 | 0.90 | 8.00 | 14.30 | 0.60 |
| Energy to Failure, 73F, 7.5 mph, 5 bars (ft-lb) | 15.04 | 12.78 | 18.76 | 16.54 | 7.64 | 17.59 | 14.65 | 0.67 |
| std. dev. | 0.58 | 0.51 | 0.58 | 0.34 | 1.00 | 0.19 | 0.51 | 0.02 |
| Total Energy, 73F, 7.5 mph, 5 discs (ft-lb) | 24.00 | 13.26 | 27.34 | 29.18 | 7.98 | 26.77 | 24.54 | 0.73 |
| std. dev. | 0.96 | 0.49 | 2.71 | 1.30 | 1.02 | 0.68 | 0.71 | 0.03 |
| Energy to Failure, −20F, 7.5 mph, 5 discs (ft-lb) | 19.32 | 1.90 | 1.53 | 22.61 | 0.90 | 22.10 | 19.78 | 0.27 |
| std. dev. | 0.25 | 0.87 | 0.69 | 0.87 | 0.28 | 0.76 | 0.40 | 0.05 |
| Total Energy, −20F, 7.5 mph, 5 discs (ft-lb) | 32.29 | 2.04 | 1.66 | 35.28 | 0.98 | 30.66 | 32.32 | 0.32 |
| std. dev. | 0.96 | 0.92 | 0.73 | 2.99 | 0.29 | 3.04 | 0.64 | 0.05 |
| Energy to Failure, −20F, 5 mph, 5 discs (ft-lb) | 19.61 | 0.99 | 1.69 | 23.02 | 0.69 | 23.84 | 20.46 | 0.57 |
| std. dev. | 0.32 | 0.36 | 1.11 | 0.50 | 0.18 | 0.46 | 0.25 | 0.37 |
| Total Energy, −20F, 5 mph, 5 discs (ft-lb) | 31.51 | 1.07 | 1.79 | 35.81 | 0.75 | 34.02 | 33.28 | 0.63 |
| std. dev. | 0.53 | 0.37 | 1.14 | 5.30 | 0.20 | 1.37 | 2.24 | 0.40 |
| Flexural Modulus, 73F, ⅛", 3 bars (kpsi) | 124,200 | 161,400 | 260,100 | 175,800 | 183,200 | 188,300 | 122,700 | 232,300 |
| Flexural Strength at yield, 73F, 3 bars, ⅛" (psi) | 4,497 | 5,536 | 9,498 | 6,332 | 6,114 | 6,752 | 4,451 | 8,046 |
| Tensile Strength at yield, 73F, 2 in/min, 5 bars (psi) | 3,375 | 3,798 | 6,389 | 4,635 | 4,145 | 4,621 | 3,351 | 5,282 |
| Tensile Strength at break, 73F, 2 in/min, 5 bars (psi) | 4,770 | 3,402 | 5,500 | — | 3,847 | 5,051 | — | 5,167 |
| Tensile Elongation at break, 73F, 2 in/min, 5 bars (%) | 394.10 | 67.99 | 92.29 | 400.00 | 38.10 | 186.10 | 400.00 | 13.06 |

| | Sample No. | | | | | | | |
|---|---|---|---|---|---|---|---|---|
| | 57 | 58 | 59 | 60 | 61 | 62 | 63 | 64 |
| HDT, 66 psi, ⅛", 3 samples (deg F.) | 251.00 | 258.30 | 259.10 | 217.00 | 256.30 | 250.40 | 270.60 | 268.10 |
| HDT, 264 psi, ⅛", 3 samples (deg F.) | 188.70 | 186.30 | 198.30 | 139.70 | 174.40 | 166.50 | 190.60 | 208.20 |
| Notched Izod, 73F, 5 bars (ft-lb/in) | 7.30 | 2.70 | 8.50 | 11.90 | 1.20 | 0.40 | 0.30 | 0.40 |
| Notched Izod, −20F, 5 bars (ft-lb/in) | 2.30 | 1.10 | 0.70 | 2.30 | 0.50 | 0.30 | 0.30 | 0.30 |
| Energy to Failure, 73F, 7.5 mph, 5 bars (ft-lb) | 17.45 | 20.10 | 20.81 | 17.20 | 11.49 | 0.75 | 0.61 | 0.86 |
| std. dev. | 0.58 | 2.11 | 0.60 | 0.17 | 7.08 | 0.47 | 0.14 | 0.21 |
| Total Energy, 73F, 7.5 mph, 5 discs (ft-lb) | 24.79 | 25.81 | 29.09 | 27.92 | 13.33 | 0.81 | 0.67 | 1.14 |
| std. dev. | 1.15 | 5.84 | 1.10 | 0.66 | 9.55 | 0.46 | 0.16 | 37.00 |
| Energy to Failure, −20F, 7.5 mph, 5 discs (ft-lb) | 11.70 | 20.10 | 20.81 | 17.20 | 11.49 | 0.75 | 0.61 | 0.86 |
| std. dev. | 5.56 | 2.11 | 0.60 | 0.17 | 7.08 | 0.47 | 0.14 | 0.21 |
| Total Energy, −20F, 7.5 mph, 5 discs (ft-lb) | 12.50 | 25.81 | 29.09 | 27.92 | 13.33 | 0.81 | 0.67 | 1.14 |
| std. dev. | 6.03 | 5.84 | 1.10 | 0.66 | 9.55 | 0.46 | 0.16 | 37.00 |
| Energy to Failure, −20F, 5 mph, 5 discs (ft-lb) | 5.48 | 2.23 | 19.06 | 18.04 | 0.40 | 0.33 | 0.25 | 0.25 |
| std. dev. | 3.75 | 0.92 | 4.79 | 3.95 | 0.07 | 27.00 | 0.21 | 19.00 |
| Total Energy, −20F, 5 mph, 5 discs (ft-lb) | 5.67 | 2.37 | 21.81 | 24.97 | 0.46 | 0.37 | 32.00 | 28.00 |
| std. dev. | 3.84 | 0.92 | 6.94 | 8.11 | 0.06 | 0.29 | 26.0 | 20.00 |
| Flexural Modulus, 73F, ⅛", 3 bars (kpsi) | 221,400 | 237,600 | 224,400 | 152,900 | 270,100 | 198,000 | 259,900 | 262,600 |
| Flexural Strength at yield, 73F, 3 bars, ⅛" (psi) | 7,736 | 8,707 | 8,474 | 5,465 | 9,392 | 6,813 | 8,972 | 8,557 |
| Tensile Strength at yield, 73F, 2 in/min, 5 bars (psi) | 5,196 | 6,000 | 6,053 | 4,289 | 6,173 | 4,567 | 5,845 | 5,719 |
| Tensile Strength at break, 73F, 2 in/min, 5 bars (psi) | 4,658 | 5,204 | 5,302 | 1,832 | 4,960 | 4,486 | 5,740 | 5,718 |
| Tensile Elongation at break, 73F, 2 in/min, 5 bars (%) | 72.90 | 93.20 | 71.30 | 137.50 | 120.60 | 12.60 | 11.60 | 8.20 |

| | Sample No. | | | | |
|---|---|---|---|---|---|
| | 65 | 66 | 67 | 68 | 69 |
| HDT, 66 psi, ⅛", 3 samples (deg F.) | 251.10 | 280.90 | 261.40 | 253.70 | 241.70 |
| HDT, 264 psi, ⅛", 3 samples (deg F.) | 168.80 | 219.90 | 200.90 | 188.30 | 172.10 |
| Notched Izod, 73F, 5 bars (ft-lb/in) | 0.70 | 0.30 | 1.00 | 10.40 | 1.60 |
| Notched Izod, −20F, 5 bars (ft-lb/in) | 0.40 | 0.30 | 0.50 | 4.10 | 0.50 |

TABLE 2-continued

| | | | | | |
|---|---:|---:|---:|---:|---:|
| Energy to Failure, 73F, 7.5 mph, 5 bars (ft-lb) | 1.33 | 0.75 | 21.28 | 20.26 | 18.98 |
| std. dev. | 24.00 | 18.00 | 0.46 | 0.28 | 0.18 |
| Total Energy, 73F, 7.5 mph, 5 discs (ft-lb) | 1.47 | 1.17 | 32.79 | 29.07 | 29.26 |
| std. dev. | 26.00 | 41.00 | 1.79 | 0.86 | 2.44 |
| Energy to Failure, −20F, 7.5 mph, 5 discs (ft-lb) | 1.33 | 0.75 | 21.28 | 20.26 | 18.98 |
| std. dev. | 24.00 | 18.00 | 0.46 | 0.28 | 0.18 |
| Total Energy, −20F, 7.5 mph, 5 discs (ft-lb) | 1.47 | 1.17 | 32.79 | 29.07 | 29.26 |
| std. dev. | 26.00 | 41.00 | 1.79 | 0.86 | 2.44 |
| Energy to Failure, −20F, 5 mph, 5 discs (ft-lb) | 0.38 | 0.10 | 7.61 | 22.76 | 1.79 |
| std. dev. | 7.00 | 0.02 | 4.34 | 0.54 | 0.72 |
| Total Energy, −20F, 5 mph, 5 discs (ft-lb) | 42.00 | 0.14 | 7.82 | 29.94 | 1.89 |
| std. dev. | 7.00 | 0.02 | 4.43 | 2.52 | 0.73 |
| Flexural Modulus, 73F, ⅛", 3 bars (kpsi) | 182,200 | 272,100 | 253,400 | 212,100 | 243,800 |
| Flexural Strength at yield, 73F, 3 bars, ⅛" (psi) | 6,510 | 9,258 | 9,549 | 7,657 | 8,755 |
| Tensile Strength at yield, 73F, 2 in/min, 5 bars (psi) | 4,515 | 6,146 | 6,608 | 5,271 | 5,777 |
| Tensile Strength at break, 73F, 2 in/min, 5 bars (psi) | 4,126 | 6,143 | 5,603 | 5,300 | 4,990 |
| Tensile Elongation at break, 73F, 2 in/min, 5 bars (%) | 25.50 | 8.70 | 125.20 | 174.80 | 237.10 |

For each property, mean values for all compositions were analyzed by linear regression to give equations (continuous mathematical models) relating property values to the compositional variables, as well as their squared terms, two-way interactions, and three-way interactions. Statistically significant models were obtained and expressed in terms of their statistically significant factors. For example, the equation derived for heat distortion temperature at 264 psi was $HDT(264) = (3.225876)*A + (0.495885)*B + (0.151981)*C + (1.322935)*D +$ $(1.110303)*E + (0.4473412)*F + (-0.00315163)*A*G + (-0.000430428)E*G +$ $(-0.00132156)*F*G \pm 6.24$ where HDT(264) is the distortion temperature at 264 psi, expressed in degrees Fahrenheit, and A–G are the amounts of the respective components defined above. The uncertainty in the last term of the equation is a standard error.

Using the same methods, statistically significant models were derived for Izod Notched Impact at 23° C., flexural modulus at 23° C., and tensile elongation at break at 23° C.:

$INI = (-0.0100609)*A + (0.0303849)*B + (-2.8205692)*C + (0.2558717)*D +$ $(-0.0192621)*E + (-0.1623591)*F + (3.292446)*A*C + (-0.3053335)*A*D +$ $(0.3176388)*A*F + (-0.00018640)*A*G + (3.6049633)*B*C +$ $(-0.00010363)*B*G + (2.9583602)*C*D + (3.4530930)*C*E +$ $(3.5242813)*C*F + (-0.00128395)*C*G + (-0.2949778)*D*E +$ $(0.2847346)*E*F + (0.000206575)*E*G + (0.0042788)*A*C*G \pm 0.267$ $FM = (6.5196489)*A + (1.6493971)*B + (1.9898650)*C + (6.1695393)*D +$ $(4.3530015)*E + (-0.05382263)*F + (-0.0072254)*A*G + (-0.0045789)*D*G +$ $(0.000517580)*E*G + (-0.00358455)*F*G \pm 6.54$ $ln(TE) = (-0.0089684)*A + (0.0157404)*B + (-3.0398038)*C + (0.00392705)*D +$ $(0.05818402)*E + (0.21942413)*F + (0.12598263)*A*B + (3.75326823)*A*C$ $+(-0.25399631)*A*F + (-0.000122714)*A*G + (3.81210804)*B*C +$ $(0.29817779)*B*D + (-0.10101145)*B*E + (-0.07531617)*B*F +$ $(-0.00590129)*B*G + (3.44884273)*C*D + (3.7100993)*C*E +$ $(3.2838318)*C*F + (-0.00104653)*C*G + (0.000311004)*D*G +$ $(-0.14916901)*E*F + (0.0000186267)*E*G + (-0.000555889)*F*G +$ $(0.00654655)*A*B*G + (0.00306537)*A*C*G + (0.00118839)*A*F*G +$ $(0.00775958)*B*C*G + (0.00681370)*B*D*G + (0.00779623)*B*E*G +$ $(0.00871343)*B*F*G \pm 0.123$ where INI is the Izod Notched Impact at 23° C. expressed in foot-pounds per inch, FM is the flexural modulus at 23° C. expressed in kilopounds per square-inch, and ln(TE) is the natural logarithm of the tensile elongation at break at 23° C. expressed in percent.

EXAMPLE 2

Figure 2:
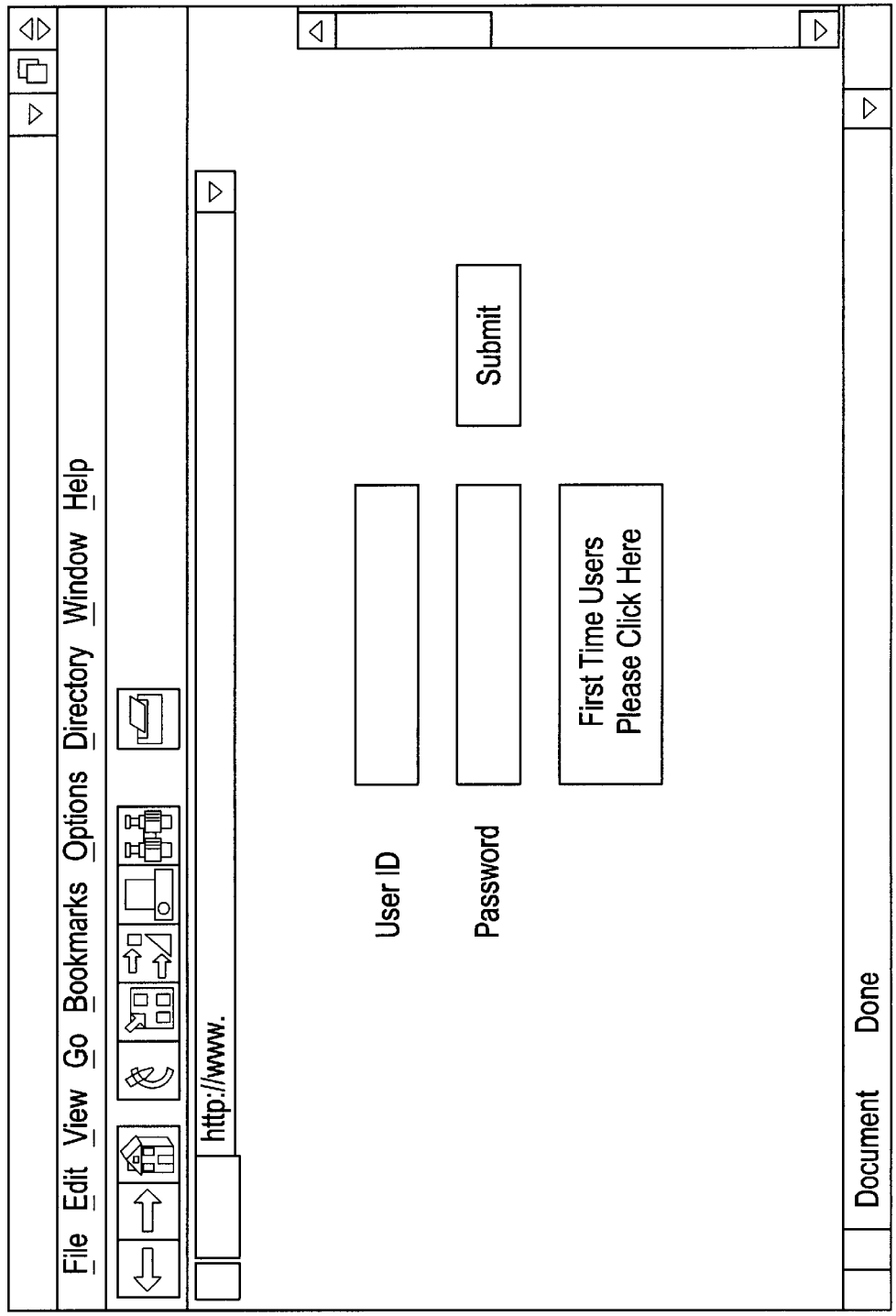

The mathematical models derived in Example 1 are employed in a method and apparatus for specifying a multi-component composition. Applications Server 12 presents a login screen as depicted in FIG. 2. A user logs in using a pre-existing user ID and password. The Applications Server 12 presents a main screen offering design and purchase modules, as depicted in FIG. 3. The user uses a peripheral device to select the Design Module Button 202. In response, the Application Server 12 launches the Design Module 200, which presents the user interface depicted in FIG. 4. The user selects the Property Types Button 212, which causes the Applications Server 12 to launch the Property Type Selection Module 210 and display the user interface depicted in FIG. 5. The user checks boxes for stiffness and impact strength, then selects the continue button. In response, the Applications Server 12 launches the Physical Property Selection Sub-Module 220 and displays the user interface depicted in FIG. 6. The user checks boxes for "flexural modulus, 23° C., ASTM D790" and "Notched Izod, 23° C., ASTM D256", then selects the continue button.

Figure 11:
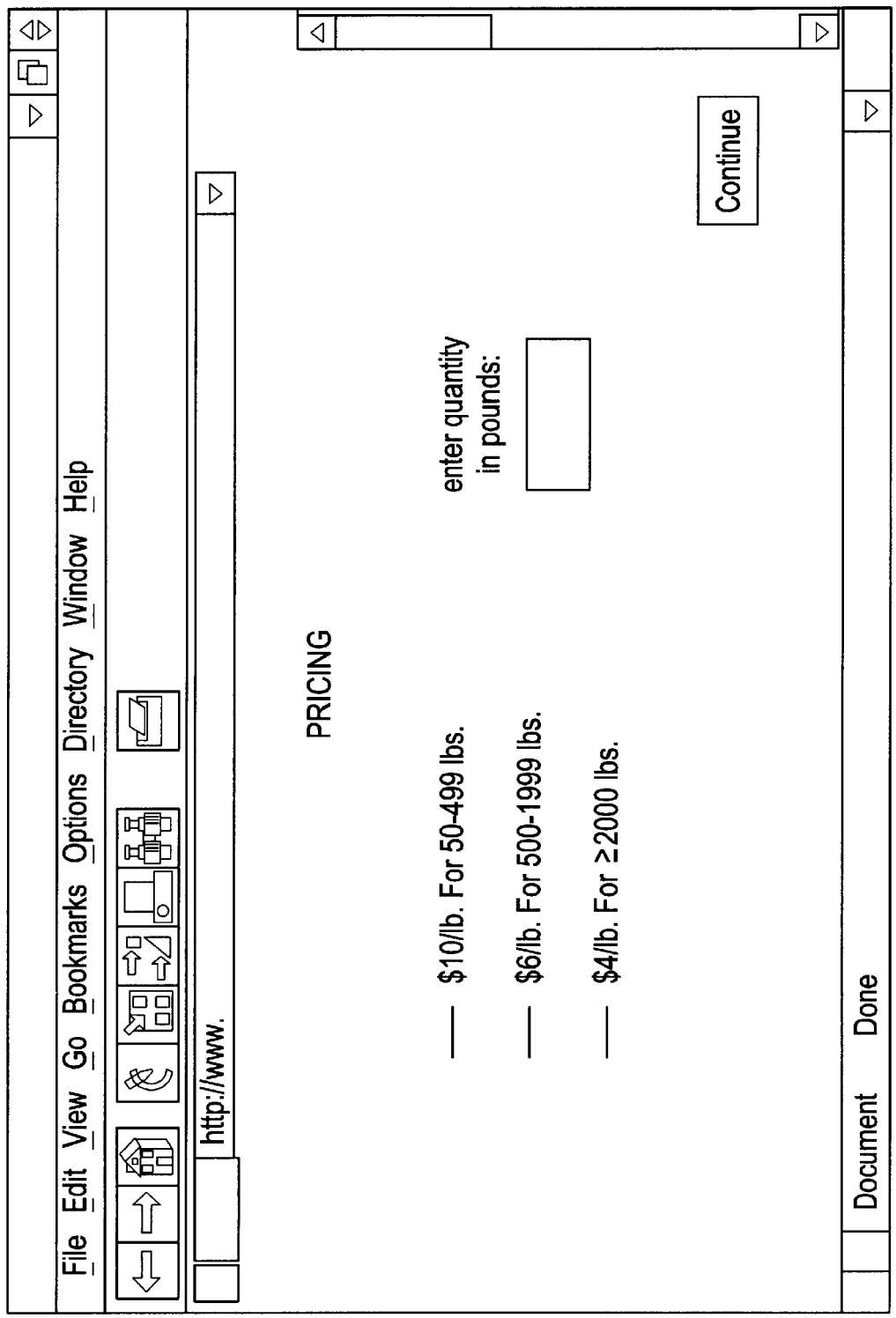
FIG. 11 depicts an exemplary user interface for a Price sub-module for providing cost information for a minimum order.
Figure 12:
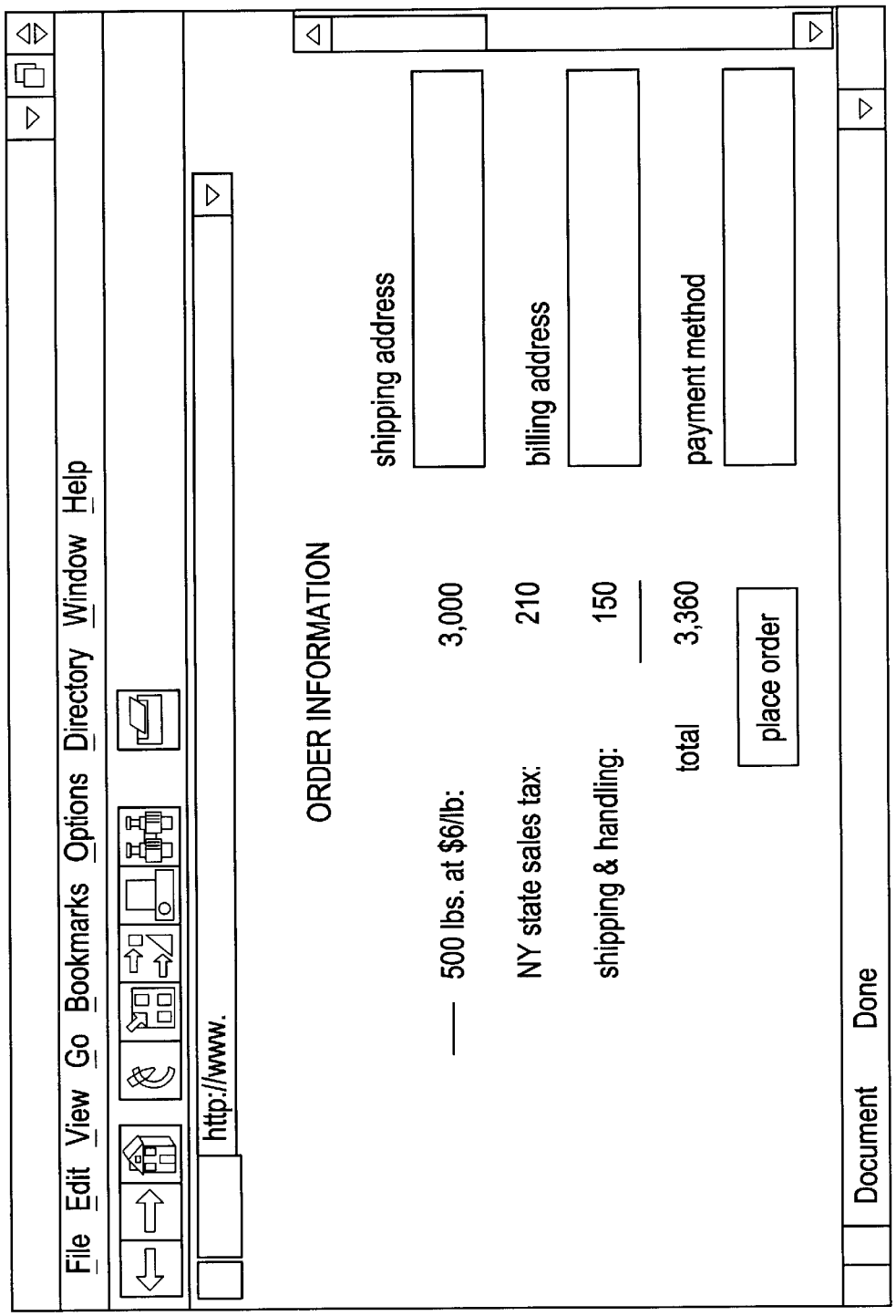
FIG. 12 depicts an exemplary user interface for an Order sub-module 330 for providing order information such as shipping and billing addresses, and payment method.

In response, the Applications Server 12 launches the Physical Property Limitation Sub-Module 230 and displays the user interface depicted in FIG. 7. Using the slider bars, the user selects a flexural modulus limitation of at least 240 kpsi and a notched Izod impact strength of at least 2.9 foot-pounds per square inch, then the user selects the continue button. In response, the Applications Server 12 launches the Recommended Composition Sub-Module 240 and displays the user interface depicted in FIG. 9. The user selects a weighting factor of 0.7:0.3 for flexural modulus and notched Izod, then the user selects the continue button. On the basis of this weighting factor, the Recommended Composition Sub-Module 240 selects the recommended composition, and it launches the Purchase Module 300, which displays the user interface depicted in FIG. 10. The user selects the pricing button. In response, the Applications Server 12 launches the Price Sub-Module 310 and displays the user interface depicted in FIG. 11, which displays price as a function of quantity. The user enters a quantity of 500 pounds and selects the continue button. In response, the Applications Server 12 launches the Order Sub-Module 320 and displays the user interface depicted in FIG. 12. The user types information into the shipping address, billing address, and payment method fields, and selects the place order button. Placement of the order launches the Applications Server 12 to launch the Formulating Sub-Module 340, which advises a component inventory system and a manufacturing facility of the order and corresponding composition. In a preferred embodiment, preparation of the order may be conducted without human intervention using a computer-controlled extruder that automatically adds and compounds the specified component amounts to produce the composition in a saleable form, such as a solid pellet. Placement of the order also launches the Billing Sub-Module 350 to secure payment for the order, which may occur, for example, when the order is shipped.

The description applying the above embodiments is merely illustrative. As described above, embodiments in the form of computer-implemented processes and apparatuses for practicing those processes may be included. Also included may be embodiments in the form of computer program code containing instructions embodied in tangible media, such as floppy diskettes, CD-ROMs, hard drives, or any other computer-readable storage medium or device, wherein, when the computer program code is loaded into and executed by a computer, the computer becomes an apparatus for practicing the invention. Also included may be embodiments in the form of computer program code, for example, whether stored in a storage medium, loaded into and/or executed by a computer, or as a data signal transmitted, whether a modulated carrier wave or unmodulated, over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

Whereas in the past the manufacturer of a multi-component composition would offer only one or a few specific compositions for sale, the present method makes it feasible to offer a continuous and theoretically infinite range of compositions that may be tailored to each customer's needs.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying out this invention, but that the invention will include all embodiments falling within the scope of the appended claims.

All cited patents and other references are incorporated herein by reference in their entirety.

What is claimed is:

1. A method for specifying a multi-component composition, comprising:

receiving, from a user system, a first limitation on a first physical property and a second limitation on a second physical property;

determining a recommended composition by searching a first continuous surface relating the first physical property to at least two compositional variables to determine first compositions that satisfy the first limitation;

searching a second continuous surface relating the second physical property to at least two compositional variables to determine second compositions that satisfy the second limitation;

determining an intersection of the first compositions and the second compositions; and selecting the recommended composition from the intersection of the first compositions and the second compositions;

predicting a value of the first physical property and a value of the second physical property for the recommended composition; and presenting, to the user system, the value of the first physical property and the value of the second physical property for the recommended composition.

2. The method of claim 1, further comprising creating a first continuous model relating the first physical property to at least two compositional variables, and creating a second continuous model relating the second physical property to at least two compositional variables.

3. The method of claim 1, further comprising predicting a value of a third physical property for the recommended composition.

4. The method of claim 3, further comprising presenting, to the user system, the value of the third physical property for the recommended composition.

5. The method of claim 1, wherein determining a recommended composition comprises accounting for statistical uncertainties in predicted values of the first physical property and the second physical property.

6. The method of claim 1, further comprising determining a cost for the recommended composition.

7. The method of claim 1, further comprising determining a price for the recommended composition.

8. The method of claim 7, further comprising sending, to the user system, the price for the recommended composition.

9. The method of claim 1, further comprising receiving, from the user system, an order for the recommended composition.

10. The method of claim 9, further comprising sending the order for the recommended composition to a manufacturing facility.

11. The method of claim 1, further comprising formulating a contracted amount of the recommended composition.

12. The method of claim 11, further comprising billing for the contracted amount of the recommended composition.

13. The method of claim 1, wherein the method is conducted without human intervention.

14. The method of claim 1, further comprising presenting a link for contacting a person for assistance.

15. The method of claim 1, further comprising determining a user connection speed of the user system and adjusting the sending in accordance with the user connection speed.

16. A method for specifying a multi-component composition, comprising:
   receiving, from a user system, a first limitation on a first physical property and a second limitation on a second physical property;
   selecting, based on the first limitation, a first continuous surface relating the first physical property to at least two compositional variables;
   selecting, based on the second limitation, a second continuous surface relating the second physical property to at least two compositional variables;
   determining a recommended composition by
      searching a first continuous surface to determine first compositions that satisfy the first limitation;
      searching a second continuous surface relating the second physical property to at least two compositional variables to determine second compositions that satisfy the second limitation;
      determining an intersection of the first compositions and the second compositions; and
      selecting the recommended composition from the intersection of the first compositions and the second compositions;
   predicting a value of the first physical property and a value of the second physical property for the recommended composition; and
   presenting, to the user system, the value of the first physical property and the value of the second physical property for the recommended composition.

17. A method for specifying a multi-component composition, comprising:
   presenting, for display at a user system, a graphical illustration of a plurality of physical property combinations satisfied by a multi-component composition, each property combination comprising a first property value and a second property value;
   receiving, from the user system, a desired property combination comprising a first desired property value and a second desired property value;
   determining a first desired property limitation based on the first desired property value and a second desired property limitation based on the second desired property value;
   determining a recommended composition by
      searching a first continuous surface relating the first property values to at least two compositional variables to determine first compositions that satisfy the first desired property limitation;
      searching a second continuous surface relating the second property values to at least two compositional variables to determine second compositions that satisfy the second desired property limitation;
      determining an intersection of the first compositions and the second compositions; and
      selecting a recommended composition from the intersection of the first compositions and the second compositions; and
   predicting a first property value and a second property value for the recommended composition; and
   presenting, to the user system, the first property value and the second property value for the recommended composition.

18. A method for specifying a multi-component thermoplastic or thermoset composition, comprising:
   receiving a first limitation on a first physical property, and a second limitation on a second physical property different from the first physical property;
   determining a recommended composition by
      searching a first continuous surface relating the first physical property to at least two compositional variables to determine first compositions that satisfy the first limitation;
      searching a second continuous surface relating the second physical property to at least two compositional variables to determine second compositions that satisfy the second limitation; and
      determining an intersection of the first compositions and the second compositions; and
      selecting a recommended composition from the intersection of the first compositions and the second compositions;
   predicting a value of the first physical property and a value of the second physical property for the recommended composition; and
   presenting, to the user system, the value of the first physical property and the value of the second physical property for the recommended composition.

19. The method of claim 18, wherein the multi-component thermoplastic composition is a thermoplastic blend or a thermoplastic alloy.

20. The method of claim 18, wherein the first physical property and the second physical property are each independently an objective property related to stiffness, impact strength, or thermal resistance.

21. The method of claim 18, wherein the first physical property and the second physical property are each independently selected from the group consisting of flexural modulus, flexural strength, tensile modulus, tensile strength, unnotched impact strength, notched impact strength, falling weight impact strength, and heat distortion temperature.

22. A method for specifying a thermoplastic blend comprising a polyolefin and a poly(arylene ether), the method being conducted without human intervention and comprising:
   receiving a first limitation on a first physical property, and a second limitation on a second physical property different from the first physical property;
   determining a recommended composition by
      searching a first continuous surface relating the first physical property to at least two compositional variables to determine first compositions that satisfy the first limitation;
      searching a second continuous surface relating the second physical property to at least two compositional variables to determine second compositions that satisfy the second limitation; and
      determining an intersection of the first compositions and the second compositions; and
      selecting a recommended composition from the intersection of the first compositions and the second compositions;
   predicting a value of the first physical property and a value of the second physical property for the recommended composition; and sending the value of the first physical property and the value of the second physical property for the recommended composition.

23. The method of claim 22, wherein the thermoplastic blend further comprises a component selected from the group consisting of a poly(alkenyl aromatic) resin, a hydrogenated block copolymer of an alkenyl aromatic compound and a conjugated diene, an unhydrogenated block copolymer of an alkenyl aromatic compound and a conjugated diene, a polypropylene-polystyrene graft copolymer, a polyolefin-graft-cyclic anhydride copolymer, an ethylene/alpha-olefin elastomeric copolymer, a reinforcing filler, and combinations comprising at least one of the foregoing components.

24. The method of claim 22, wherein the first physical property and the second physical property are each independently an objective property related to stiffness, strength, or thermal resistance.

25. The method of claim 22, wherein the first physical property and the second physical property are each independently selected from the group consisting of flexural modulus, flexural strength, tensile modulus, tensile strength, unnotched impact strength, notched impact strength, falling weight impact strength, and heat distortion temperature.

26. A method for specifying a thermoplastic blend comprising a propylene polymer and a poly(arylene ether), the method being conducted without human intervention and comprising:
   receiving a first limitation on a first physical property, and a second limitation on a second physical property different from the first physical property;
   determining a recommended composition by
      searching a first continuous surface relating the first physical property to at least two compositional variables to determine first compositions that satisfy the first limitation;
      searching a second continuous surface relating the second physical Property to at least two compositional variables to determine second compositions that satisfy the second limitation; and
      determining an intersection of the first compositions and the second compositions; and
      selecting a recommended composition from the intersection of the first compositions and the second compositions;
   predicting a value of the first physical property and a value of the second physical property for the recommended composition; and
   sending the value of the first physical property and the value of the second physical property for the recommended composition;
   wherein the composition comprises a propylene polymer, a poly(arylene ether), a poly(alkenyl aromatic) resin, a hydrogenated block copolymer of an alkenyl aromatic compound and a conjugated diene, an unhydrogenated block copolymer of an alkenyl aromatic compound and a conjugated diene, a polypropylene-polystyrene graft copolymer, and an ethylene-butylene rubber, wherein the poly(alkenyl aromatic) resin may comprise 0–100 weight percent of a rubber-modified polystyrene, and wherein the first physical property is flexural modulus at 23° C. and the first continuous surface is defined by the equation $$FM = (6.5196489)*A + (1.6493971)*B + (1.9898650)*C +$$
$$(6.1695393)*D + (4.3530015)*E + (-0.05382263)*F +$$
$$(-0.0072254)*A*G + (-0.0045789)*D*G + (0.000517580)*E*G +$$
$$(-0.00358455)*F*G \pm 6.54$$

wherein FM is the flexural modulus at 23° C. expressed in kpsi, A is the weight percent, based on the total composition, of a 60:40 weight/weight mixture of the poly(arylene ether) and the poly(alkenyl aromatic) resin, B is the weight percent, based on the total composition, of the unhydrogenated block copolymer of an alkenyl aromatic compound and a conjugated diene, C is the weight percent, based on the total composition, of the hydrogenated block copolymer of an alkenyl aromatic compound and a conjugated diene, D is the weight percent, based on the total composition, of the polypropylene-polystyrene graft copolymer, E is the weight percent, based on the total composition, of the propylene polymer, F is the weight percent of the ethylene-butylene rubber, and G is the weight percent, based on the total weight of poly(alkenyl aromatic) resin, of the rubber modified polystyrene.

27. A method for specifying a thermoplastic blend comprising a propylene polymer and a poly(arylene ether), the method being conducted without human intervention and comprising:
   receiving a first limitation on a first physical property, and a second limitation on a second physical property different from the first physical property;
   determining a recommended composition by
      searching a first continuous surface relating the first physical property to at least two compositional variables to determine first compositions that satisfy the first limitation;
      searching a second continuous surface relating the second physical property to at least two compositional variables to determine second compositions that satisfy the second limitation; and
      determining an intersection of the first compositions and the second compositions; and
      selecting a recommended composition from the intersection of the first compositions and the second compositions;
   predicting a value of the first physical property and a value of the second physical property for the recommended composition; and
   sending the value of the first physical property and the value of the second physical property for the recommended composition;
   wherein the composition comprises a propylene polymer, a poly(arylene ether), a poly(alkenyl aromatic) resin, a hydrogenated block copolymer of an alkenyl aromatic compound and a conjugated diene, an unhydrogenated block copolymer of an alkenyl aromatic compound and a conjugated diene, a polypropylene-polystyrene graft copolymer, and an ethylene-butylene rubber, wherein the poly(alkenyl aromatic) resin may comprise 0–100 weight percent of a rubber-modified polystyrene, and wherein the first physical property is heat distortion temperature at measured at 264 psi and the first continuous surface is defined by the equation $$HDT(264) = (3.225876)*A + (0.495885)*B + (0.151981)*C +$$
$$(1.322935)*D + (1.110303)*E + (0.4473412)*F + (-0.00315163)*A*G + (-0.000430428)E*G +$$
$$(-0.00132156)*F*G \pm 6.24$$

wherein HDT(264) is the heat distortion temperature at measured at 264 psi expressed in degrees centigrade, A is the weight percent, based on the total composition, of a 60:40 weight/weight mixture of the poly(arylene ether) and the poly(alkenyl aromatic) resin, B is the weight percent, based on the total composition, of the unhydrogenated block copolymer of an alkenyl aromatic compound and a conjugated diene, C is the weight percent, based on the total composition, of the hydrogenated block copolymer of an alkenyl aromatic compound and a conjugated diene, D is the weight percent, based on the total composition, of the polypropylene-polystyrene graft copolymer, E is the weight percent, based on the total composition, of the propylene polymer, F is the weight percent of the ethylene-butylene rubber, and G is the weight percent, based on the total weight of poly(alkenyl aromatic) resin, of the rubber modified polystyrene.

28. A method for specifying a thermoplastic blend comprising a propylene polymer and a poly(arylene ether), the method being conducted without human intervention and comprising:

receiving a first limitation on a first physical property, and a second limitation on a second physical property different from the first physical property;
  determining a recommended composition by
    searching a first continuous surface relating the first physical property to at least two compositional variables to determine first compositions that satisfy the first limitation:
    searching a second continuous surface relating the second physical property to at least two compositional variables to determine second compositions that satisfy the second limitation; and
    determining an intersection of the first compositions and the second compositions; and
    selecting a recommended composition from the intersection of the first compositions and the second compositions;
  predicting a value of the first physical property and a value of the second physical Property for the recommended composition; and
  sending the value of the first physical property and the value of the second physical property for the recommended composition;
  wherein the composition comprises a propylene polymer, a poly(arylene ether), a poly(alkenyl aromatic) resin, a hydrogenated block copolymer of an alkenyl aromatic compound and a conjugated diene, an unhydrogenated block copolymer of an alkenyl aromatic compound and a conjugated diene, a polypropylene-polystyrene graft copolymer, and an ethylene-butylene rubber, wherein the poly(alkenyl aromatic) resin may comprise 0–100 weight percent of a rubber-modified polystyrene, and wherein the first physical property is the Izod notched impact strength at 23° C. and the first continuous surface is defined by the equation $$INI = (-0.0100609)*A + (0.0303849)*B + (-2.8205692)*C +$$
$$(0.2558717)*D + (-0.0192621)*E + (-0.1623591)*F +$$
$$(3.292446)*A*C + (-0.3053335)*A*D + (0.3176388)*A*F +$$
$$(-0.00018640)*A*G + (3.6049633)*B*C + (-0.00010363)*B*G +$$
$$(2.9583602)*C*D + (3.4530930)*C*E + (3.5242813)*C*F +$$
$$(-0.00128395)*C*G + (-0.2949778)*D*E + (0.2847346)*E*F +$$
$$(0.000206575)*E*G + (0.0042788)*A*C*G \pm 0.267$$

wherein INI is the Izod notched impact strength at 23° C. expressed in foot-pounds/inch, A is the weight percent, based on the total composition, of a 60:40 weight/weight mixture of the poly(arylene ether) and the poly(alkenyl aromatic) resin, B is the weight percent, based on the total composition, of the unhydrogenated block copolymer of an alkenyl aromatic compound and a conjugated diene, C is the weight percent, based on the total composition, of the hydrogenated block copolymer of an alkenyl aromatic compound and a conjugated diene, D is the weight percent, based on the total composition, of the polypropylene-polystyrene graft copolymer, E is the weight percent, based on the total composition, of the propylene polymer, F is the weight percent of the ethylene-butylene rubber, and G is the weight percent, based on the total weight of poly(alkenyl aromatic) resin, of the rubber modified polystyrene.

29. A method for specifying a thermoplastic blend comprising a propylene polymer and a poly(arylene ether), the method being conducted without human intervention and comprising:

receiving a first limitation on a first physical property, and a second limitation on a second physical property different from the first physical property;
  determining a recommended composition by
    searching a first continuous surface relating the first physical property to at least two compositional variables to determine first compositions that satisfy the first limitation;
    searching a second continuous surface relating the second physical property to at least two compositional variables to determine second compositions that satisfy the second limitation; and
    determining an intersection of the first compositions and the second compositions; and
    selecting a recommended composition from the intersection of the first compositions and the second compositions;
  predicting a value of the first physical property and a value of the second physical property for the recommended composition; and
  sending the value of the first physical property and the value of the second physical property for the recommended composition;
  wherein the composition comprises a propylene polymer, a poly(arylene ether), a poly(alkenyl aromatic) resin, a hydrogenated block copolymer of an alkenyl aromatic compound and a conjugated diene, an unhydrogenated block copolymer of an alkenyl aromatic compound and a conjugated diene, a polypropylene-polystyrene graft copolymer, and an ethylene-butylene rubber, wherein the poly(alkenyl aromatic) resin may comprise 0–100 weight percent of a rubber-modified polystyrene, and wherein the first physical property is tensile elongation at 23° C. and the first continuous surface is defined by the equation $$\ln(TE) = (31\ 0.0089684)*A + (0.0157404)*B + (-3.0398038)*C +$$
$$(0.00392705)*D + (0.05818402)*E + (0.21942413)*F +$$
$$(0.12598263)*A*B + (3.75326823)*A*C +$$
$$(-0.25399631)*A*F + (-0.000122714)*A*G +$$
$$(3.81210804)*B*C + (0.29817779)*B*D + (-$$
$$0.10101145)*B*E + (-0.07531617)*B*F +$$
$$(-0.00590129)*B*G + (3.44884273)*C*D +$$
$$(3.7100993)*C*E + (3.2838318)*C*F + (-0.00104653)*C*G +$$

$(0.000311004)*D*G+(-0.14916901)*E*F+$ $(0.0000186267)*E*G+(-0.000555889)*F*G+$ $(0.00654655)*A*B*G+(0.00306537)*A*C*G+$ $(0.00118839)*A*F*G+(0.00775958)*B*C*G+$ $(0.00681370)*B*D*G+(0.00779623)*B*E*G+$ $(0.00871343)*B*F*G\pm 0.123$ wherein ln(TE) is the natural logarithm of the tensile elongation at break at 23° C. expressed in percent, A is the weight percent, based on the total composition, of a 60:40 weight/weight mixture of the poly(arylene ether) and the poly(alkenyl aromatic) resin, B is the weight percent, based on the total composition, of the unhydrogenated block copolymer of an alkenyl aromatic compound and a conjugated diene, C is the weight percent, based on the total composition, of the hydrogenated block copolymer of an alkenyl aromatic compound and a conjugated diene, D is the weight percent, based on the total composition, of the polypropylene-polystyrene graft copolymer, E is the weight percent, based on the total composition, of the propylene polymer, F is the weight percent of the ethylene-butylene rubber, and G is the weight percent, based on the total weight of poly(alkenyl aromatic) resin, of the rubber modified polystyrene.

30. A system for specifying a multi-component composition without human intervention, comprising:
a host system for
receiving a first limitation on a first physical property and a second limitation on a second physical property;
determining a recommended composition by
searching a first continuous surface relating the first physical property to at least two compositional variables to determine first compositions that satisfy the first limitation;
searching a second continuous surface relating the second physical property to at least two compositional variables to determine second compositions that satisfy the second limitation;
determining an intersection of the first compositions and the second compositions; and
selecting a recommended composition from the intersection of the first compositions and the second compositions;
predicting a value of the first physical property and a value of the second physical property for the recommended composition; and
sending the value of the first physical property and the value of the second physical property for the recommended composition; and
a network coupled to the host system.

31. The system of claim 30, further comprising a user system coupled to the network.

32. The system of claim 30, further comprising a storage device coupled to the host system.

33. A system for specifying a multi-component composition without human intervention, comprising:
a host means for
receiving a first limitation on a first physical property and a second limitation on a second physical property;
determining a recommended composition by
searching a first continuous surface relating the first physical property to at least two compositional variables to determine first compositions that satisfy the first limitation;
searching a second continuous surface relating the second physical property to at least two compositional variables to determine second compositions that satisfy the second limitation;
determining an intersection of the first compositions and the second compositions; and
selecting a recommended composition from the intersection of the first compositions and the second compositions;
predicting a value of the first physical property and a value of the second physical property for the recommended composition; and
sending the value of the first physical property and the value of the second physical property for the recommended composition; and
a means for storing data relating to the multi-component composition.

34. A storage medium encoded with machine-readable computer program code for determining a multi-component composition, the storage medium including instructions for causing a processor to implement a method comprising:
receiving a first limitation on a first physical property and a second limitation on a second physical property;
determining a recommended composition by
searching a first continuous surface relating the first physical property to at least two compositional variables to determine first compositions that satisfy the first limitation;
searching a second continuous surface relating the second physical property to at least two compositional variables to determine second compositions that satisfy the second limitation;
determining an intersection of the first compositions and the second compositions; and
selecting a recommended composition from the intersection of the first compositions and the second compositions;
predicting a value of the first physical property and a value of the second physical property for the recommended composition; and
sending the value of the first physical property and the value of the second physical property for the recommended composition.

35. A computer data signal for determining a multi-component composition, the computer data signal comprising code configured to cause a processor to implement a method comprising:
receiving a first limitation on a first physical property and a second limitation on a second physical property;
determining a recommended composition by
searching a first continuous surface relating the first physical property to at least two compositional variables to determine first compositions that satisfy the first limitation;
searching a second continuous surface relating the second physical property to at least two compositional variables to determine second compositions that satisfy the second limitation;
determining an intersection of the first compositions and the second compositions; and
selecting a recommended composition from the intersection of the first compositions and the second compositions;

predicting a value of the first physical property and a value of the second physical property for the recommended composition; and sending the value of the first physical property and the value of the second physical property for the recommended composition.

36. The computer data signal of claim 35, wherein the computer data signal is embodied in a carrier wave.

37. The computer data signal of claim 35, wherein the computer data signal is unmodulated.

* * * * *